United States Patent
Thrimawithana et al.

(10) Patent No.: US 11,431,196 B2
(45) Date of Patent: Aug. 30, 2022

(54) MISALIGNMENT TOLERANT HYBRID WIRELESS POWER TRANSFER SYSTEM

(71) Applicant: Auckland Uniservices Limited, Auckland (NZ)

(72) Inventors: Duleepa Jayanath Thrimawithana, Auckland (NZ); Lei Zhao, Auckland (NZ)

(73) Assignee: Auckland Uniservices Limited, Auckland (NZ)

( * ) Notice: Subject to any disclaimer, the term of this patent is extended or adjusted under 35 U.S.C. 154(b) by 0 days.

(21) Appl. No.: 16/768,314

(22) PCT Filed: Dec. 3, 2018

(86) PCT No.: PCT/NZ2018/050172
§ 371 (c)(1),
(2) Date: May 29, 2020

(87) PCT Pub. No.: WO2019/108071
PCT Pub. Date: Jun. 6, 2019

(65) Prior Publication Data
US 2021/0184496 A1     Jun. 17, 2021

(30) Foreign Application Priority Data

Dec. 1, 2017    (NZ) ........................................ 737973

(51) Int. Cl.
*B60L 53/12*     (2019.01)
*H02J 50/00*     (2016.01)
*H02J 50/12*     (2016.01)

(52) U.S. Cl.
CPC ............ *H02J 50/005* (2020.01); *H02J 50/12* (2016.02); *B60L 53/12* (2019.02)

(58) Field of Classification Search
CPC ...... H02J 50/005; H02J 50/12; H02J 2310/48; H02J 50/10; H02J 50/70; H02J 50/40;
(Continued)

(56) References Cited

U.S. PATENT DOCUMENTS 9,859,707 B2    1/2018    Corum et al.
2010/0259217 A1   10/2010   Baarman et al.
(Continued)

FOREIGN PATENT DOCUMENTS

WO     2010090539 A1    8/2010
WO     2011016737 A1    2/2011
(Continued)

OTHER PUBLICATIONS

Wikipedia contributors. "Series and parallel circuits." Wikipedia, The Free Encyclopedia. Wikipedia, The Free Encyclopedia, Aug. 1, 2021. Web. Aug. 17, 2021. (Year: 2021).*

(Continued)

*Primary Examiner* — Daniel Cavallari
(74) *Attorney, Agent, or Firm* — Edell, Shapiro & Finnan, LLC

(57) ABSTRACT

The disclosure provides a wireless power transfer circuit that uses two coupled resonators provided in one of a primary or secondary wireless power transfer magnetic structure. The coupled resonators work together to compensate for changes in relative position. Each resonator has a planar coil, and the resonators are coupled with each other by magnetic coupling of the planar coils, which are located adjacent each other in either a side by side relationship or a partially overlapping relationship. The circuit is tolerant to misalignment of the magnetic structures (often referred to as pads) which magnetically couple with each other to enable the transfer of power. The changes in inductances as well as main, cross, and inter coupling between the coils of the primary and (Continued)

pick-up pads or structures show that a constant power transfer or charging profile can be maintained over a large operating region.

15 Claims, 18 Drawing Sheets

(58) Field of Classification Search
CPC ... B60L 53/12; H02M 3/003; H02M 3/33584; H02M 1/0048; H02M 1/0058; H02M 3/337; Y02T 90/14; Y02T 10/70; Y02T 10/7072; H04B 5/0037; H04B 5/0087; H01F 38/14; H01F 2038/146; H01F 27/24; H04J 7/02
See application file for complete search history.

(56) References Cited

U.S. PATENT DOCUMENTS

| | | |
|---|---|---|
| 2011/0304216 A1 | 12/2011 | Baarman |
| 2012/0313444 A1 | 12/2012 | Boys et al. |
| 2014/0159656 A1* | 6/2014 | Riehl ............... H02J 50/402 320/108 |
| 2014/0361630 A1 | 12/2014 | Boys |
| 2015/0015197 A1 | 1/2015 | Mi et al. |
| 2015/0061403 A1 | 3/2015 | Jeong et al. |
| 2015/0170833 A1 | 6/2015 | Widmer |
| 2020/0083753 A1* | 3/2020 | Bhat ............... H02J 7/0042 |

FOREIGN PATENT DOCUMENTS

| | | |
|---|---|---|
| WO | 2011145953 A1 | 11/2011 |
| WO | 2012018269 A1 | 2/2012 |
| WO | 2014035260 A1 | 3/2014 |
| WO | WO-2015097813 A1 * | 7/2015 ............. H02J 50/12 |
| WO | 2017023180 A1 | 2/2017 |

OTHER PUBLICATIONS

International Search Report and Written Opinion received in International Application No. PCT/NZ2018/050172, dated Mar. 25, 2019, (15 pages).
Zhao et al., "Hybrid Bidirectional Wireless EV Charging System Tolerant to Pad Misalignment," in IEEE Transactions on Industrial Electronics, vol. 64, No. 9, pp. 7079-7086, Sep. 2017, (8 pages).
Zhao et al., "A Hybrid Wireless Charging System with DDQ Pads for Dynamic Charging of EVs'", 2017 IEEE PELS Workshop on Emerging Technologies: Wireless Power Transfer (WoW), May 20-22, 2017 (6 pages).
Deng J. et al., "Magnetic Integration of LCC Compensated Resonant Converter for Inductive Power Transfer Applications", 2014 IEEE Energy Conversion Congress and Exposition (ECCE), Sep. 14-18, 2014, pp. 660-667 (8 pages).
Song Y. et al., "LCL and CL Compensations for Wireless Three Phase Bi-directional EV Charging Systems", 2016 IEEE 2nd Annual Southern Power Electronics Conference (SPEC), Dec. 5-8, 2016 (6 pages).
Aditya K. et al., "Magnetic Characterization of Unsymmetrical Coil Pairs Using Archimedean Spirals for Wider Misalignment Tolerance in IPT Systems", IEEE Transactions on Transportation Electrification, vol. 3, No. 2, Jun. 2017, pp. 454-463 (10 pages).
Lu, Fei et al., "A Dual-Coupled LCC-Compensated IPT System to Improve Misalignment Performance", 2017 IEEE PELS Workshop on Emerging Technologies: Wireless Power Transfer (WoW), May 2017, 8 pages.
Kan, Tianze et al., "A New Integration Method for an Electric Vehicle Wireless Charging System Using LCC Compensation Topology: Analysis and Design", IEEE Transactions on Power Electronics, vol. 32, No. 2, Feb. 2017, 13 pages.
Deng, Junjun et al., "Compact and Efficient Bipolar Coupler for Wireless Power Chargers: Design and Analysis", IEEE Transactions on Power Electronics, vol. 30, No. 11, Nov. 2015, 11 pages.
Li, Weihan et al., "Integrated LCC Compensation Topology for Wireless Charger in Electric and Plug-in Electric Vehicles", IEEE Transactions on Industrial Electronics, vol. 62, No. 7, Jul. 2015, 11 pages.
"International Application No. PCT/NZ2016/050125, International Search Report and Written Opinion dated Nov. 11, 2016", (Nov. 11, 2016), 15 pgs.
"International Application No. PCT/NZ2016/050125, International Preliminary Report on Patentability dated Feb. 6, 2018", (Feb. 6, 2018), 9 pgs.

* cited by examiner

MISALIGNMENT TOLERANT HYBRID WIRELESS POWER TRANSFER SYSTEM

FIELD

This invention relates to wireless power transfer, and in particular to circuits and magnetics for wireless power transfer. One application of the invention is wireless battery charging.

BACKGROUND

Wireless power transfer, also known as inductive power transfer (IPT), facilitates both uni- and bi-directional power transfer, over small and large air-gaps, and at power levels ranging up to tens of kilowatts, and efficiencies as high as 96%. It is safe, environmentally inert, convenient and reliable. Applications of IPT technology continue to grow, with applications ranging from cell phone battery charging to vehicle charging and dynamic wireless charging systems.

Alignment of a pick-up device with a primary device is difficult and tiresome for users. In roadway vehicle applications for example, it means maneuvering a vehicle into a required position with some degree of precision, which many users find time consuming and frustrating.

A typical wireless EV charging system that is based on IPT technology, is shown in FIG. 1 in which a vehicle such as an automobile 10 is parked on a roadway. The roadway 12 includes a primary pad structure 1 for making a time varying magnetic field available to a pick-up pad structure 2 provided on the vehicle, to enable wireless power transfer to the vehicle. The primary pad 1 has a primary coil C1 which is connected to a compensation network 5 which makes the coil C1 resonant at the operating frequency or frequencies for power transfer. The coil C1 and compensation network are driven by a power converter 6 which draws power from utility supply 7.

The coil C2 of pick-up pad structure 2 in use receives power from the time varying magnetic field produced by coil 3. Coil C2 is connected to compensation network 8 which supplies the power to load 9 which may consist of a battery and/or an electric motor for example.

As illustrated in FIG. 1, under practical operating conditions, lateral (X), longitudinal (Y) and vertical (Z) misalignment between the primary pad 1 and pick-up pad 2 (also known as the secondary pad) is unavoidable. Misalignment between the primary and pick-up pads 1 and 2 causes changes in the self and mutual inductances of the coils C1 (primary pad) and C2 (pick-up pad), which in turn result in instability, reduction in power transfer, and an increase in power losses.

Having to park with perfect alignment can be very difficult, so would have a negative impact on the user acceptance of the wireless charging technology. Therefore, the development of low-cost and reliable circuit topologies and control techniques that enable IPT systems to operate efficiently under misalignment has become a critical design aspect in recent times.

One approach to solving the misalignment problem is the use of more advanced control systems, but these are expensive and usually need to rely on communication systems that can at times be unreliable.

Another approach has been to consider the circuit and magnetic design i.e. the design of the coils and compensation networks. A parallel hybrid IPT EV charging system, which is tolerant to three dimensional pad misalignments has been disclosed in International patent publication WO2017023180. In that disclosure, the primary as well as the pick-up employ inductor-capacitor-inductor (LCL) and capacitor-inductor (CL) compensation networks that are fed by the same converter and are connected separately to each of the windings in a bi-polar pad. Due to the complementing characteristics of LCL and CL compensation networks, variations in self- and mutual-inductance introduced by pad misalignments have slight impacts on both the real- and reactive-power throughput within its operating region. Therefore, that system, which did not employ a power regulator, exhibited a relatively constant power and efficiency over 15% and 100% variation of self- and mutual-inductances, respectively.

However, when pads move out of the operating region, the circulating current in the primary CL compensation network increases exponentially and can easily exceed the ratings of the power converters. The increase in circulating current is caused by the decrease in reflected impedance with increasing distance between the pads, and, as a result, an over current regulation circuit is required, particularly in the case of the dynamic charging. The current regulation circuit will increase system losses and may reduce reliability.

Object

It is an object of the present invention to provide improved wireless power transfer circuits, systems or methods.

SUMMARY

In one broad aspect the invention provides a wireless power transfer circuit comprising:

a first resonator comprising a first planar coil for coupling power;

a second resonator having a second planar coil for coupling power;

the first and second resonators being magnetically coupled with each other, and the first and second planar coils being provided in substantially the same plane.

In some examples, the second coil is provided in opposite polarity to the first coil.

The first resonator may comprise a fully compensated parallel compensation network, and the second resonator may comprise a partially compensated series compensation network In some examples the first resonator further comprises a first compensation capacitor connected in series with the first planar coil, and the second resonator further comprises a second compensation capacitor connected in series with the second planar coil.

The first resonator may further comprise a third compensation capacitor connected in parallel with the series connected first compensation capacitor and first planar coil.

An inverter may be operatively connected to the circuit to provide an alternating current in the first and/or second coils. Alternatively, a rectifier may be operatively connected to the circuit to rectify an alternating current in the first and/or second coils.

In some examples one of the resonators is excited by the other. For example, the second resonator may be passive and/or is excited by the first resonator.

The coils may be provided side by side, or at least partially overlap each other, and/or are non-concentric. In some examples the coils are asymmetric.

In another broad aspect the invention provides a wireless power transfer circuit comprising:

a first resonator comprising a first coil for coupling power connected in series with a first compensation capacitor, and a third compensation capacitor connected in parallel with the series connected first coil and first compensation capacitor;

a second resonator having a second coil for coupling power connected in series with a second compensation capacitor, and;

the first and second resonators being magnetically coupled with each other.

In some examples the second coil is provided in opposite polarity to the first coil.

In another broad aspect the invention provides a wireless power transfer circuit comprising:

a first resonator comprising a first planar coil for coupling power;

a second resonator having a second planar coil for coupling power;

the coils of the first and second resonators being connected in opposite polarity to each other, and the first and second planar coils being provided in substantially the same plane.

The invention may also broadly be said to subsist in any novel feature or combination of features disclosed herein. Further aspects will be apparent from the following description.

DRAWING DESCRIPTION

Examples of the invention will be described with reference to the accompanying drawings, in which:

FIG. 4(*b*) is a diagram showing Inter coupling for a DD pad;

FIG. 4(*c*) is a diagram showing Inter coupling for a bi-polar pad;

FIG. 8(*c*) is a graph of variation in output power due to pad misalignment Z-axis: 140 mm;

DETAILED DESCRIPTION

This disclosure presents a novel wireless power transfer circuit and system with integrated magnetics, which is tolerant to misalignment of the magnetic structures (often referred to as pads) which magnetically couple with each other to enable the transfer of power. The changes in inductances as well as main, cross, and inter coupling between the coils of the primary and pick-up pads or structures show that a constant power transfer or charging profile can be maintained over a large operating region.

The disclosure provides a wireless power transfer circuit that uses two magnetically coupled resonators. The coupled resonators work together to compensate for changes in relative position, as will be described in more detail below. Each resonator has a planar coil, and the resonators are coupled with each other by magnetic coupling of the planar coils, which are located adjacent each other in either a side by side relationship or a partially overlapping relationship. The circuit is used as part of a primary and/or secondary wireless power transfer magnetic coupling structure.

Like references refer to like features throughout the specification and drawings.

Figure 1:
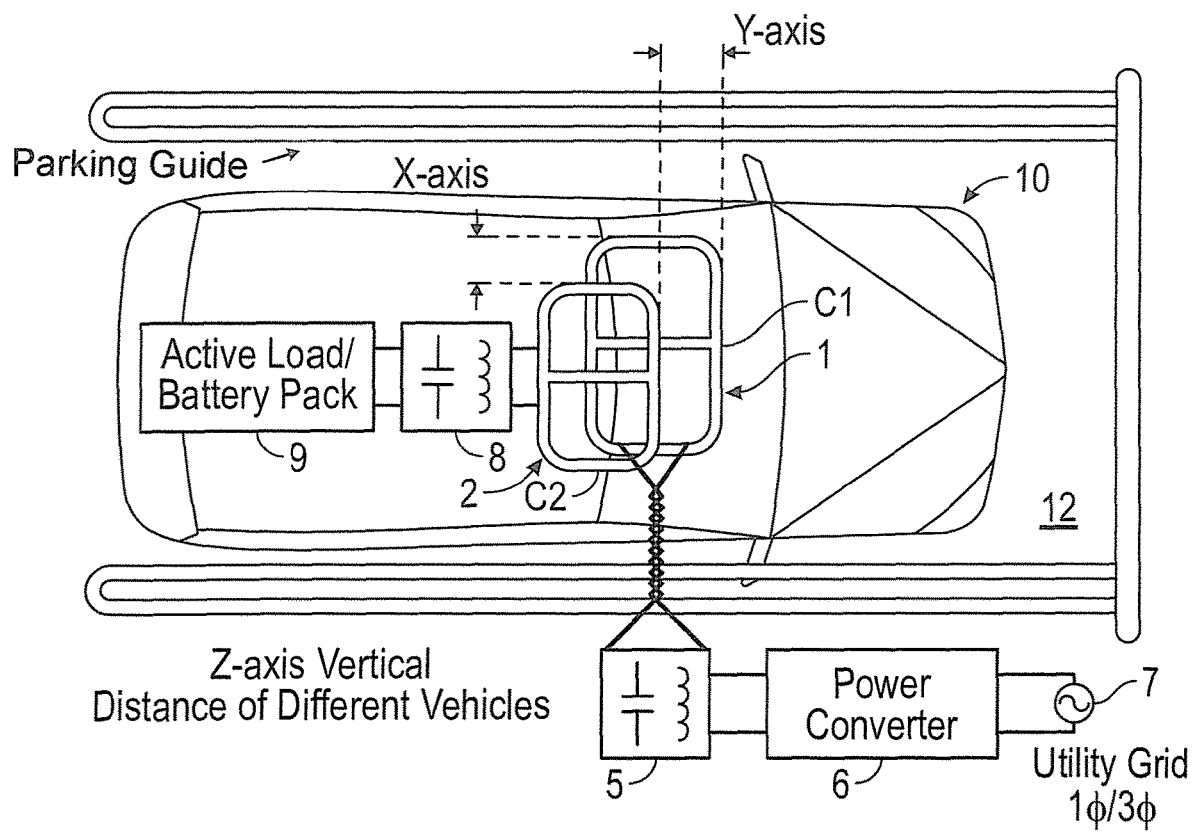
FIG. 1 is a diagram showing an example of a typical EV stationary charging system.
Figure 2:
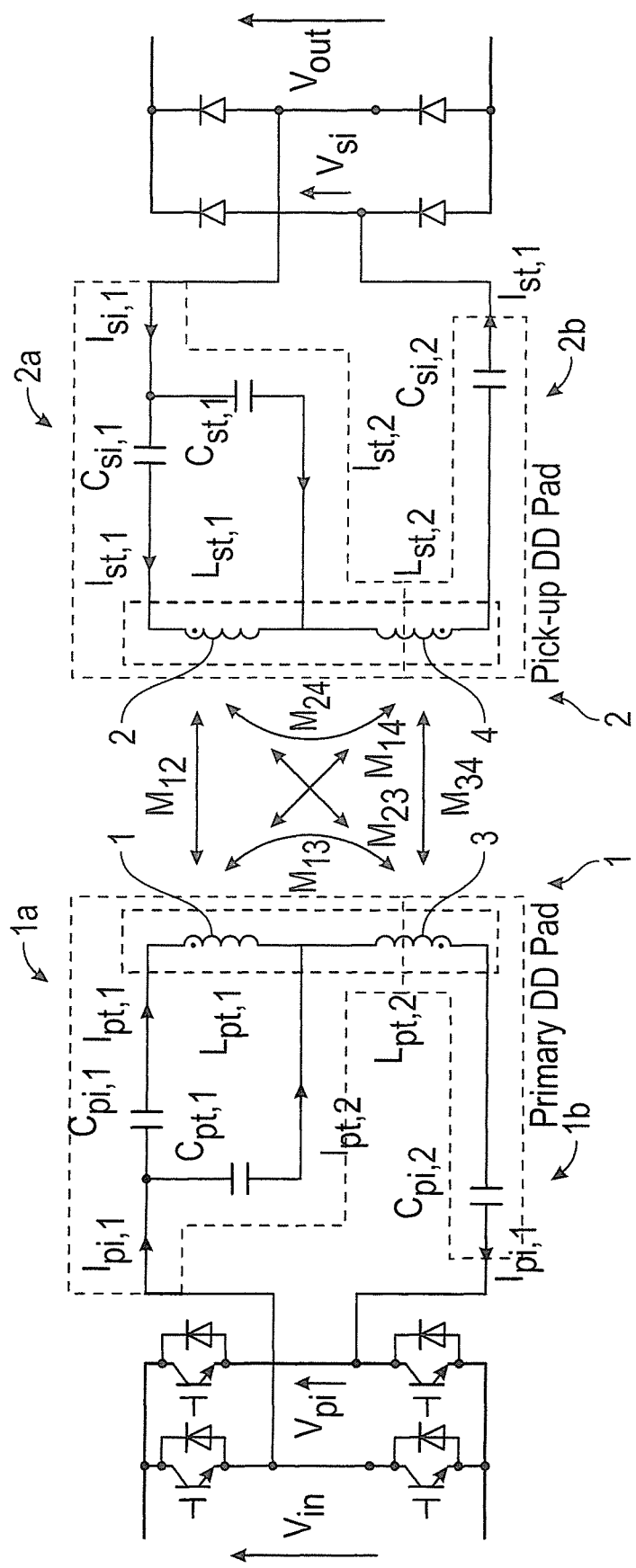
FIG. 2 is a circuit topology according to a first example.

A first example of a circuit topology according to the invention is shown in FIG. 2. The primary pad 1 includes first resonator 1*a* and second resonator 1*b*. The first resonator includes a first coil $L_{pt,1}$. The second resonator includes second coil $L_{pt,2}$. In this example the first and second coils are the two coils of a "DD" pad. A DD pad comprises two magnetically coupled planar coils that are located side by side in substantially the same plane. DD coil structures are disclosed in International patent publication WO2010090539, the disclosure of which is incorporated herein by reference.

The second resonator includes a second capacitor $C_{pi,2}$ to partially tune the second coil, $L_{pt,2}$, of the primary pad. This second resonator comprises a partially compensated series compensation network, being a series CL compensation network. In this example the second resonator is connected in series with the first resonator comprising a fully compensated parallel compensation network formed by the first coil, $L_{pt,1}$, of the primary DD pad with $C_{pi,1}$ and $C_{pt,1}$. Capacitor $C_{pi,1}$ comprises a first capacitor connected in series with the first coil, and $C_{pt,1}$ is a third capacitor connected in parallel with the series connected combination of $L_{pt,1}$, and $C_{pi,1}$ The residual inductance of the partially tuned, $L_{pt,2}$, together with the $L_{pt1}$, $C_{pi1}$ and $C_{pt1}$ consists of a fully compensated LCL network.

The pick-up circuit for this example, which is shown on the right-hand side of FIG. 2, utilizes an identical compensation topology, having a pad 2 which includes a first resonator 2*a* and second resonator 2*b*. The first resonator includes a first coil Lst,1. The second resonator includes second coil Lst,2. Again, the first and second coils are the two coils of a "DD" pad.

The compensation networks are the same as those described above for the primary, the subscript "s" notation being used to distinguish the components from those of the primary. In this example the outputs of the compensation networks are connected to a diode rectifier. Alternatively, the pick-up may employ a synchronous rectifier to improve the power transfer efficiency and to enable bi-directional power flow. Accordingly, this new topology allows the integration of the series inductor found in a traditional LCL tuned IPT system with the primary/pick-up pad, thus reducing the cost and component count. A DD pad is also used for the coils on the pick-up or secondary side.

This proposed series hybrid topology also offers improved tolerance against misalignment. For example, if the magnetic coupling between the pads is reduced due to misalignment, it will cause the reflected impedance across $L_{pt,2}$ to reduce, while inducing a larger reflected impedance across the $L_{pt,1}$. This in turns leads to a reduction in power transferred through $L_{pt,2}$ but increases the power through $L_{pt,1}$. The result is a nearly constant charging profile within its designed operating region. The inter coupling $M_{13}$ between the primary coils $L_{pt,1}$ and $L_{pt,2}$, together with this novel hybrid compensation topology also limits the circulating currents in the system.

The primary coils $L_{pt,1}$ and $L_{pt,2}$ and the secondary coils $L_{st,1}$ and $L_{st,2}$ are planar or flat and may be non-concentric, and in at least some constructions may also be asymmetric about at least one axis of symmetry.

Figure 3:
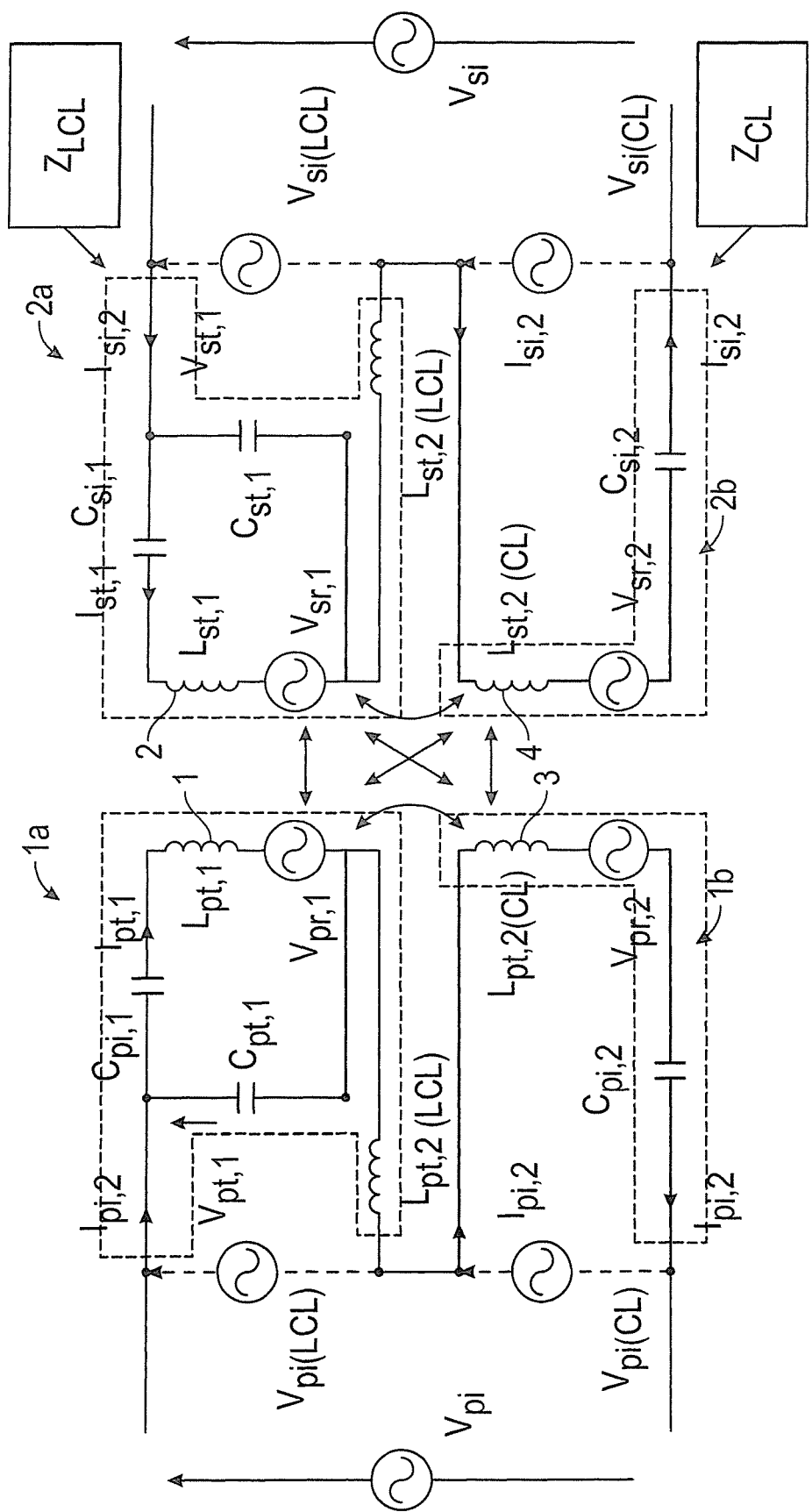
FIG. 3 is the equivalent circuit of the topology shown in FIG. 2.

An equivalent circuit of the proposed series hybrid IPT system is shown in FIG. 3. The DD pad in primary and pickup side are modelled as four separate coils $L_{pt,1}$, $L_{pt,2\ (CL)}$, $L_{st,1}$ and $L_{st,2\ (CL)}$ with main-couplings $M_{12}$ and $M_{34}$, inter-couplings $M_{13}$ and $M_{24}$, and cross-couplings $M_{14}$ and $M_{23}$. The cross-coupling notation is most easily seen with respect to FIG. 2. The impedance of the first coil and compensation network is labelled $Z_{LCL}$, and the second coil and compensation network $Z_{CL}$.

Figure 4:
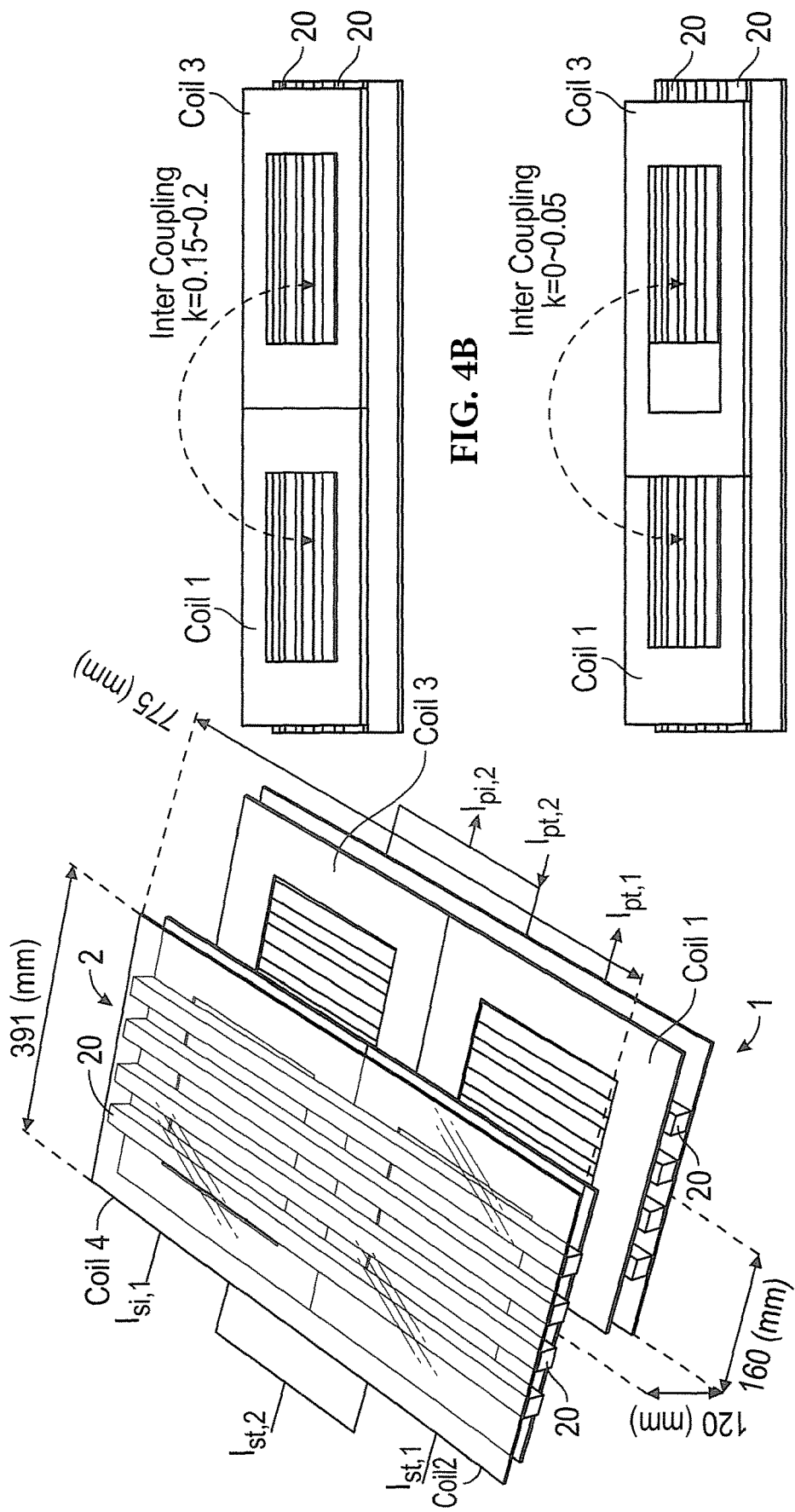
FIG. 4(*a*) is a diagram showing pad displacement at (160, 0, 120)

In FIG. 4 an example of the wireless power transfer magnetic coupling structures referred to above is illustrated. In FIG. 4(a), the primary 1 and secondary 2 pads are shown in DD configuration, with the coils 1 to 4 as per FIGS. 2 and 3. A layer of magnetically permeable material comprising pieces of permeable material such as ferrite bars 20 is provided on one side of the coils. In FIG. 4(a) the pads are shown misaligned in the x direction by 160 mm.

FIG. 4(b) shows a primary or secondary magnetic coupling structure in DD configuration i.e. one of the structures shown in FIG. 4(a), showing the intercoupling between the two adjacent coils which may be for example k=0.15 to 0.2.

FIG. 4(c) shows a primary or secondary magnetic coupling structure in Bipolar configuration i.e. as an alternative to one or both of the structures shown in FIG. 4(a), and showing the intercoupling between the two partially overlapping coils which may be for example k=0 to 0.05.

As will be apparent from the examples shown in FIGS. 11-18, there are a number of different circuit topologies which are available, and in which the first or second resonators may be excited actively or passively. For example, in the example shown in FIG. 11, the second resonator is a passive resonator which is excited by the first resonator. The circuit topology examples of FIGS. 11-18 include first and second resonators as described with reference to the FIG. 2 embodiment, and may be used with substantially co-planar magnetically coupled coils such as those described and shown in FIG. 4 i.e. DD and Bipolar pad structures. It is also apparent that some of the arrangements (for example FIGS. 13, 14, and 18) may have a single coil pick-up, and all the arrangements may be bi-directional.

The residual inductance of $L_{pt,2}$ is modelled as series inductor $L_{pt,2\ (LCL)}$ together with the $C_{pi,1}$ $C_{pt,1}$ $L_{pt,1}$, to form a fully tuned LCL network. The reflected voltage $V_{pr,1}$ and $V_{pr,2}$ relate to the reflected voltage $V_{sr,1}$ and $V_{sr,2}$, due to the coupling between the coils. The pick-up side is using an identical modelling method, therefore, $$\omega = \frac{1}{\sqrt{L_{pt,2(CL)} \cdot C_{pi,2}}} = \frac{1}{\sqrt{L_{st,2(CL)} \cdot C_{si,2}}} \quad (1)$$

$$= \frac{1}{\sqrt{L_{pt,2(LCL)} \cdot C_{pt,1}}} = \frac{1}{\sqrt{L_{st,2(LCL)} \cdot C_{st,1}}}$$

Where, $$L_{pt,2} = L_{pt,2(CL)} + L_{pt,2(LCL)}, L_{st,2} = L_{st,2(CL)} + L_{st,2(LCL)}$$

The parameters of the prototype at the nominal alignment position in millimetres between pads x,y,z (0, 0, 120) are given in Table I. The input and output voltages of the prototype represent by $V_{in}$ and $V_{out}$, respectively. $V_{in}$ composed of $V_{in(LCL)}$ and $V_{in(CL)}$, which the $V_{in(CL)}$ is a function of reflected voltage $V_{pr,2}$. Similarly, the $V_{out(CL)}$ is a function of reflected voltage $V_{sr,2}$, and together with $V_{out(LCL)}$ to form $V_{out}$.

TABLE I

PARAMETERS OF THE PROPOSED HYBRID IPT SYSTEMS

| Parameter | Value | ESR |
|---|---|---|
| $L_{pt,1}$ | 83.57 µH | 125 mΩ |
| $L_{pt,2}$ | 82.71 µH | 130 mΩ |
| $L_{pt,2\ (CL)}$ | 61.00 µH | — |
| $L_{pt,2\ (LCL)}$ | 21.71 µH | — |
| $L_{st,1}$ | 81.85 µH | 122 mΩ |
| $L_{st,2}$ | 82.56 µH | 126 mΩ |
| $L_{st,2\ (CL)}$ | 61.00 µH | — |
| $L_{st,2\ (LCL)}$ | 21.56 µH | — |
| $C_{pt,1}$ | 0.1705 µF | 7.6 mΩ |
| $C_{st,1}$ | 0.1655 µF | 8.3 mΩ |
| $C_{pi,1}$ | 0.0664 µF | 11.2 mΩ |
| $C_{si,1}$ | 0.0645 µF | 10.5 mΩ |
| $C_{pi,2}$ | 0.0677 µF | 11.9 mΩ |
| $C_{si,2}$ | 0.0644 µF | 12.3 mΩ |
| $V_{in}$ & $V_{out}$ | 280 V | |
| f | 85.0 kHz | |
| k (at 0, 0, 120 mm) | 0.28 | |
| Switches | C3M0065090D | |

In order to explain the operating principles of this novel series hybrid IPT system, a detailed mathematical model is developed based on the equivalent circuit model proposed in the preceding section. Therefore, consider the situation where the primary and secondary side converters are operated at frequency f and with phase modulations $\varphi_p$ and $\varphi_s$, respectively. The voltages produced, $V_{pi}$ and $V_{si}$, includes harmonics, can thus be given as, $$V_{pi} = V_{in} \cdot \frac{4}{\pi} \sum_{n=1,3,5...}^{\infty} \frac{1}{n} \cos(n\omega t) \sin\left(\frac{n\varphi_p}{2}\right) \quad (2)$$

$$V_{si} = V_{out} \frac{4}{\pi} \sum_{n=1,3...}^{\infty} \frac{1}{n} \cos(n\omega t - n\theta) \sin\left(\frac{n\varphi_s}{2}\right) \quad (3)$$

where, $\omega=2\pi f$ is the angular frequency, and 'n' represents the number of harmonics. Phase angle θ, is the relative phase difference between $V_{pi}$ and $V_{si}$. $L_{pt,2(CL)}$ and $L_{st,2(CL)}$ shown in FIG. 3 are fixed inductance values, which are independent of misalignment as the changes in pad inductance caused by misalignment is lumped in to $L_{pt,2(LCL)}$ and $L_{st,2(LCL)}$. Furthermore, as shown by the equivalent circuit model, $L_{pt,2(CL)}$ and $L_{st,2(CL)}$ are compensated by $C_{pi,2}$ and $C_{si,2}$, respectively. Therefore, $$V_{pi(LCL)} = V_{pi} - V_{pr,2} \quad (4)$$

$$V_{si(LCL)} = V_{si} - V_{sr,2} \quad (5)$$

The voltages, $V_{pr,2}$ and $V_{sr,2}$ are the reflected voltages on $L_{pt,2}$ and $L_{st,2}$. The currents flowing through the coils of the CL networks, can be derived as in [2], which are given by, $$I_{pi,2} = \frac{-I_{pr,1} \cdot Z_{pr} + V_{pi(LCL)}}{(Z_{pr} + Z_{pi,2})} \quad (6)$$

$$I_{si,2} = \frac{-I_{sr,1} \cdot Z_{sr} + V_{si(LCL)}}{(Z_{sr} + Z_{si,2})} \quad (7)$$

The currents $I_{pr,1}$ and $I_{sr,1}$ are, $$I_{pr,1} = \frac{(j\omega M_{12} \cdot I_{st,1} + j\omega M_{13} \cdot I_{pi,2} + j\omega M_{14} \cdot I_{si,2})}{Z_{pt,1}} \quad (8)$$

$$I_{sr,1} = \frac{(j\omega M_{12} \cdot I_{pt,1} + j\omega M_{23} \cdot I_{pi,2} + j\omega M_{24} \cdot I_{si,2})}{Z_{st,1}} \quad (9)$$

Similarly, the currents flowing through the coils of the LCL networks, are derived as, $$I_{pt,1} = \frac{I_{pi,2} \cdot Z_p - V_{pr,1}}{(Z_p + Z_{pt,1})} \quad (10)$$

$$I_{st,1} = \frac{I_{si,2} \cdot Z_s - V_{sr,1}}{(Z_s + Z_{st,1})} \quad (11)$$

where, $$Z_{pz,1} = \frac{1}{j\omega C_{pt,1}} + R_{Cpt,1}, \quad Z_{sc,1} = \frac{1}{j\omega C_{st,1}} + E_{Cst,1}$$

$$Z_{pi,2} = j\omega L_{pt,2} + \frac{1}{j\omega C_{pi,2}} + R_{pr,2}$$

$$Z_{si,2} = j\omega L_{st,2} - \frac{1}{j\omega C_{si,2}} + R_{sr,2}$$

$$Z_{pt,1} = j\omega L_{pt,1} + \frac{1}{j\omega C_{pi,1}} + R_{Lpt,1} + R_{Cpi,1}$$

$$Z_{st,1} = j\omega L_{st,1} + \frac{1}{j\omega C_{si,1}} + R_{Lst,1} + R_{Csi,1}$$

$$Z_{pi,2} = j\omega L_{pt,2} + \frac{1}{j\omega C_{pi,2}} + R_{Lpt,2} + R_{Cpi,2}$$

$$Z_{si,2} = j\omega L_{st,2} + \frac{1}{j\omega C_{si,2}} + R_{Lst,2} + R_{Csi,2}$$

$$Z_p = \frac{Z_{pi,2} \cdot Z_{pc,1}}{Z_{pi,2} + Z_{pc,1}}, \quad Z_s = \frac{Z_{si,2} \cdot Z_{sc,1}}{Z_{si,2} + Z_{sc,1}}$$

$$Z_{pr} = \frac{Z_{pt,1} \cdot Z_{pc,1}}{Z_{pt,1} + Z_{pc,1}}, \quad Z_{sr} = \frac{Z_{st,1} \cdot Z_{sc,1}}{Z_{st,1} + Z_{sc,1}}$$

$$I_{pi,2} = \frac{1}{K_1} \left[ -j\omega M_{12} \frac{V_{si}Z_s - V_{sr,2}Z_s - V_{sr,1}Z_{si,2}}{(Z_s + Z_{st,1})Z_{si,2}} Z_{pr} - \right.$$
$$\frac{\omega^2 M_{14} M_{12}(V_{pi}Z_p - V_{pr,2}Z_p - V_{pr,1}Z_{pi,2})Z_{sr}Z_{pr}}{((Z_{sr} + Z_{si,2})Z_{st,1} + j\omega M_{24}Z_{sr})(Z_p + Z_{pt,1})Z_{pi,2}} +$$
$$\left. \frac{j\omega M_{14}(V_{si} - V_{sr,2})Z_{st,1}Z_{pr}}{((Z_{sr} + Z_{si,2})Z_{st,1} + j\omega M_{24}Z_{sr})} + (V_{pi} - V_{pr,2})Z_{pt,1} \right]$$

Where $K_1$ is given as, $$K_i = (Z_{pr} + Z_{pi,2})Z_{pt,1} + j\omega M_{13}Z_{pr} + \frac{\omega M_{14}\omega M_{23}Z_{sr}Z_{pr}}{((Z_{sr} + Z_{si,2})Z_{st,1} + j\omega M_{24} \cdot Z_{Sr})} \quad (12)$$

$c_{pt,1}$, $R_{Cst,1}$, $R_{Lpt,1}$, $R_{Lst,1}$, $R_{Cpi,1}$, $R_{Csi,1}$, $R_{Lpt,2}$, $R_{Lst,2}$, $R_{Cpi,2}$ and $R_{Csi,2}$ represent the resistances of the coils, inductors and capacitors employed in the two hybrid-tuning networks.

The currents flowing through the coils as a function of supply voltages can be derived from (6)-(11). For example, $I_{pi,2}$ can be derived using (6)-(11) as given by (12). Similarly, $I_{si,2}$, $I_{pt,1}$ and $I_{st,1}$, can be derived from (6)-(11), but are not shown in this document.

The reflected voltages $V_r$ consists of $V_{pr,1}$, $V_{sr,1}$, $V_{pr,2}$ and $V_{sr,2}$, which can be expressed as, $$V_r = j\omega \cdot M \times I \quad (13)$$

where M represents the mutual coupling between the coils of the pads, and I consist of the currents $I_{pi,2}$, $I_{si,2}$, $I_{pt,1}$ and $I_{st,1}$. The voltages (2)-(5) and the currents can be then substituted into (13) to obtain the reflected voltages $V_r$. As this mathematical derivation is complicated and tedious, for clarity, the detailed solution for the reflected voltages $V_r$ are not presented. The output power can now be derived as given by, $$P_{out} = -\text{Re}: \{V_{si} \cdot I^*_{si,2}\} \quad (14)$$

As the current $I_{pt,1}$ and $I_{pi,1}$ are 90° out of phase, to deliver power to the pick-up through both $L_{pt,1}$ and $L_{pt,2}$ the primary coils are physically connected in opposite polarity or opposite sense, making the coupling, $M_{34}$, between coil 3 to coil 4 negative. As shown in FIG. 2 and FIG. 4 (a), the reversed dots next to $L_{pt,1}$, and $L_{pt,2}$, indicate the negative coupling. This also leads to a negative coupling $M_{13}$, from coil 1 to coil 3, which in turn increases the input impedance seen by the primary inverter when the pick-up pad is not in the vicinity of the primary pad, which can be applied to degrade the circulating currents and losses in the coils. As a result, when the pick-up pad is not in the vicinity of the primary pad, the circulating current flowing through the inverter and the hybrid compensation network is minimized, as given by:

$$I_{pi,2} = \frac{V_{pi} \cdot (Z_p + Z_{pt,1})}{[Z_{pi,2}(Z_p + Z_{pt,1}) - j\omega M_{13} \cdot Z_p - \omega^2 M_{13}^2]} \quad (15)$$

A negative $M_{13}$ and an $M_{34}$ is achieved by connecting the two coils of the primary DD in opposite polarity as shown in FIG. 2 (a) and FIG. 2 (b). This opposite polarity connection is also seen in a number of the other circuit topology examples, such as those shown in FIGS. 11-18. Alternatively, bi-polar pads, shown in FIG. 4. (c), can be used but as the coils are magnetically decoupled, such an implementation will lead to a higher circulating current. However, due to zero $M_{13}$ and $M_{24}$ the mathematical analysis could be significantly simplified. A detailed comparison between these two options is presented in Section V. Bi-polar pad structures have two or more flat or substantially planar coils which partially overlap each other in such a manner that they are substantially or completely magnetically decoupled. The overlapping coils may be provided in parallel adjacent planes so that the coils effectively share the same plane, or part of each coil is in the same plane. The coils thus form part of a pad structure which is substantially planar. These coil arrangements and magnetic structures are disclosed in patent publication WO2011/016737 which is incorporated herein by reference. For clarity, a DD pad structure is shown in FIG. 4(a), and a Bi-polar structure is shown in FIG. 4(c). In each case, the coils are shown in rectangular form (for ease of reference as other shapes may be used), located over a magnetically permeable structure which in this example comprises a number of elongate parallel ferrite bars.

To illustrate the ability of the proposed hybrid-IPT system to maintain a nearly constant power transfer under misaligned operating conditions, 160 mm horizontal (x-axis) and 40 mm vertical (Z-axis) displacements of the pick-up pad 2 with reference to the stationary primary pad 1 were considered. The tuned position of the system has been chosen as the location when the pick-up pad is orientated 120 mm directly above the primary pad, (0, 0, 120), simulating the average height of a motor vehicle with the orientation for maximum coupling. Therefore, the system exhibits strongest coupling between the pads when the pick-up pad is located at (0, 0, 100), where $k_{12}$ and $k_{34}$ are approximately 0.35. A significant change in main coupling is observed with increasing vertical and horizontal displacement, as both $k_{12}$ and $k_{34}$ drops to 0.14 at (160, 0, 140). In contrast, the changes in inter- and cross-coupling are relatively small and constant, which vary from 0.2 to 0.15 and from 0.15 to 0.08, respectively, as the pads are misaligned. It should also be noted that the self-inductance of the coils changes by about 6% across this operating region.

The relationship between system parameters and power transfer derived in (14) is complex and as a result provides limited insight to system operation. As such, (14) is simplified assuming the coupling terms, $k_{13}$, $k_{24}$ and $k_{14}$, $k_{23}$, are zero and both the primary and pick-up compensation networks are tuned to the operating frequency, which is given by, $$P_h = \frac{8 \cdot V_{in} \cdot V_{out}}{\pi^2 \cdot \omega \cdot \left( \frac{L_{pt,2(LCL)} \cdot L_{st,2(LCL)}}{k_{12} \cdot \sqrt{L_{pt,1} \cdot L_{st,1}}} + k_{34} \cdot \sqrt{L_{pt,2} \cdot L_{st,2}} \right)} \quad (16)$$

As is evident from (16), the power throughput of the system is proportional to $k_{12}$ and inversely proportional to $k_{34}$. However, the contribution of $k_{12}$ and $k_{34}$ to the power transfer depends on the relative sizes of coil inductances, $L_{pt1}$, $L_{st1}$ $L_{pt2}$, $L_{st2}$, $L_{pt2(LCL)}$ and $L_{pt2(LCL)}$. Therefore, to capture the effect of relative sizes of these inductances, as given by (16), a ratio, $\kappa_T$ is defined.

$$K_T = \sqrt{\frac{L_{pt,2(LCL)}}{\sqrt{L_{pt,1} \cdot L_{pt,2}}} \cdot \frac{L_{st,2(LCL)}}{\sqrt{L_{st,1} \cdot L_{st,2}}}} \quad (17)$$

where, $$L_{pt,2(LCL)} = L_{pt,2} - \frac{1}{\omega^2 C_{pi,2}}, L_{st,2(LCL)} = L_{st,2} - \frac{1}{\omega^2 C_{st,2}}$$

Equation (16) can now be expressed as a function of $k_{12}$, $k_{34}$ and $\kappa_T$ as given by, $$P_h = \frac{8 \cdot V_{in} \cdot V_{out} \cdot k_{12}}{\pi^2 \cdot \omega \cdot \sqrt{L_{pt,1} \cdot L_{st,1}} \cdot (K_T^2 + k_{12} \cdot k_{34})} \quad (18)$$

Figure 5:
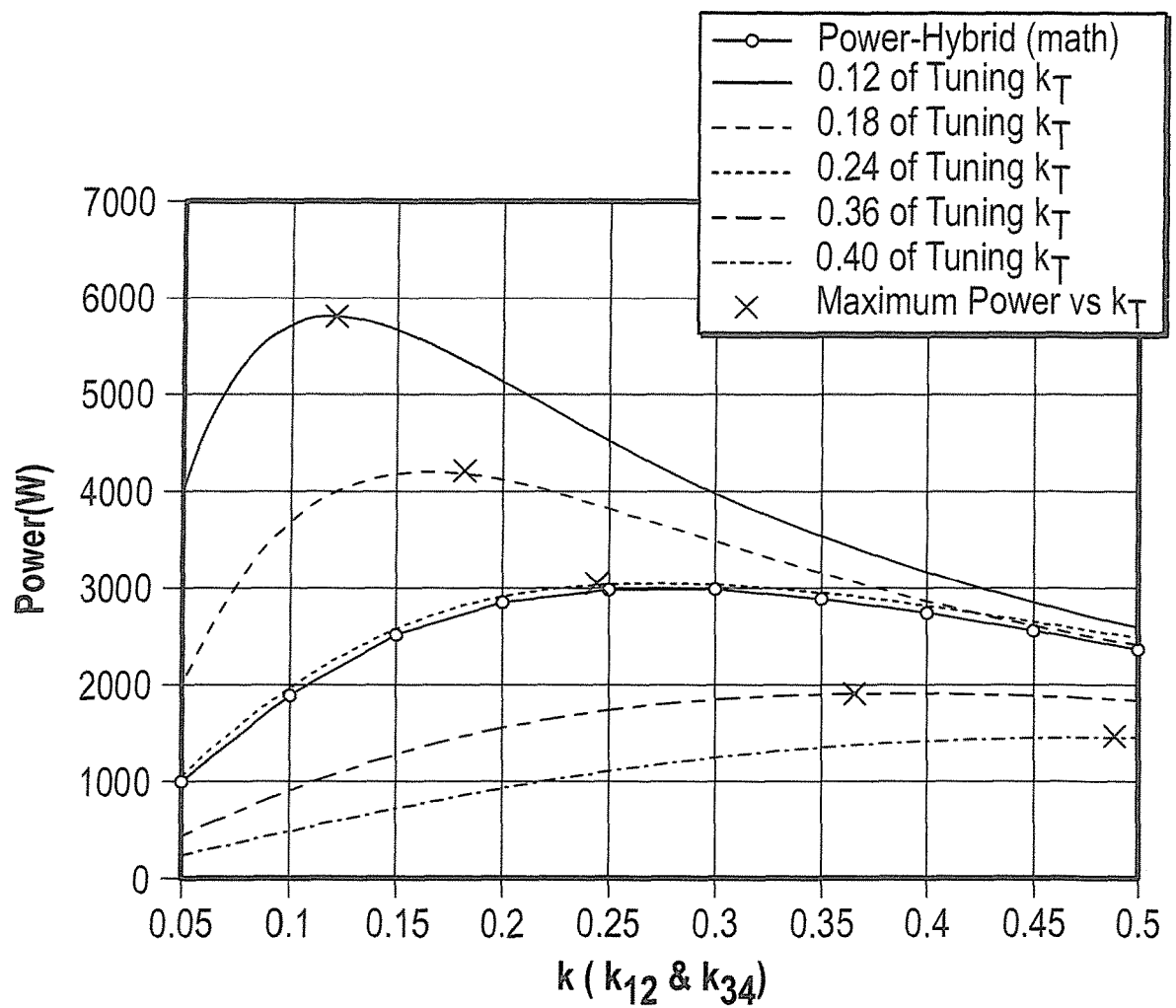
FIG. 5 is a graph showing power plotted against coupling factor for different values of $k_T$.

Using (18) the optimum value of $K_T$ can be found for a given set of operating parameters. This optimum value of $\kappa_T$ can be realized by selecting the capacitors $C_{pi,2}$ and $C_{si,2}$ as given in (17). Alternatively, the DD pads can employ coils with different inductances to achieve a similar behavior. For example, FIG. 5 depicts the power throughput of the system with the parameters listed in Table 1, as a function of $k_{12}$, $k_{34}$ and $\kappa_T$. In this example, since only X-axis and Z-axis displacements are considered, $k_{12}$ and $k_{34}$ are approximately the same, and varies between 0.15 to 0.35. When $\kappa_T$ changes from 0.12 to 0.24 the variation in power throughput with $k_{12}$ and $k_{34}$ reduces. However, a further increase in Kr towards 0.48 results in a decline of system performance as the variation in power throughput with $k_{12}$ and $k_{34}$ increases. Therefore, the optimum value of $\kappa_T$ is taken as 0.24, for the system considered in this paper, as this results in the lowest variation in power throughput over the operating region indicated in FIG. 5. It should be also noted that when $k_{12}$ and $k_{34}$ are identical to $\kappa_T$, power throughput is a maximum as indicated by the dotted line.

The accuracy of the simplified model is validated by simulating the system in Matlab™ PLECS accounting for coupling terms, $k_{13}$, $k_{24}$ and $k_{14}$, $k_{23}$ as well as changes in self-inductance of the coils. As is evident from FIG. 5, the simulated power throughput of the system with a $\kappa_T$ of 0.24 closely matches the results obtained from (18), thus validating the accuracy of the analysis presented above.

In order to verify the applicability of the proposed concept, a 3.3 kW novel series hybrid IPT system was designed and built. The parameters and operating conditions of the prototype system are given in Table I. The system was intentionally operated without any modulation on the controller to demonstrate its high tolerance to pad misalignments.

Figure 6:
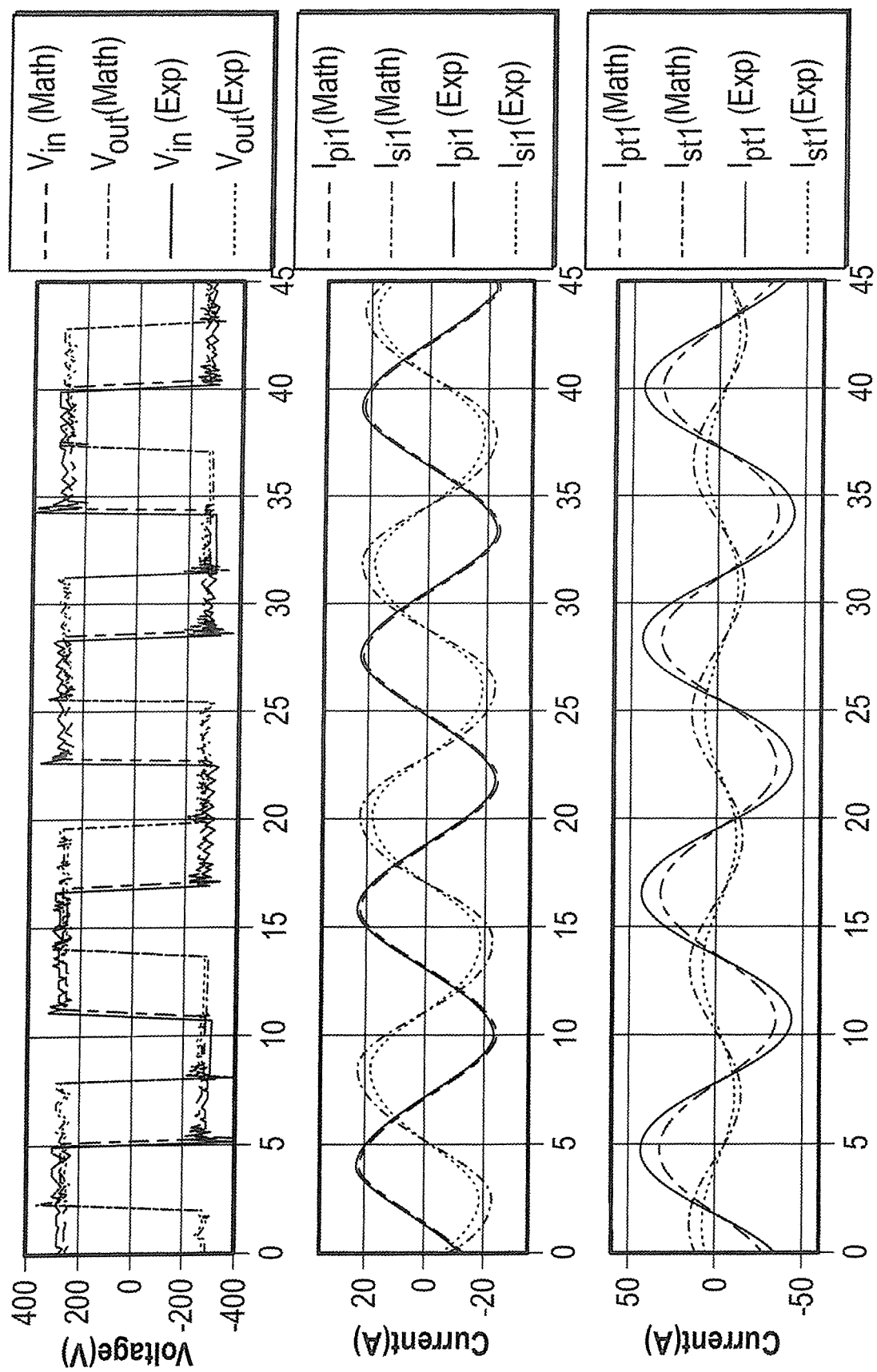
FIG. 6 shows current waveforms at the tuned position (0, 0, 120)
Figure 7:
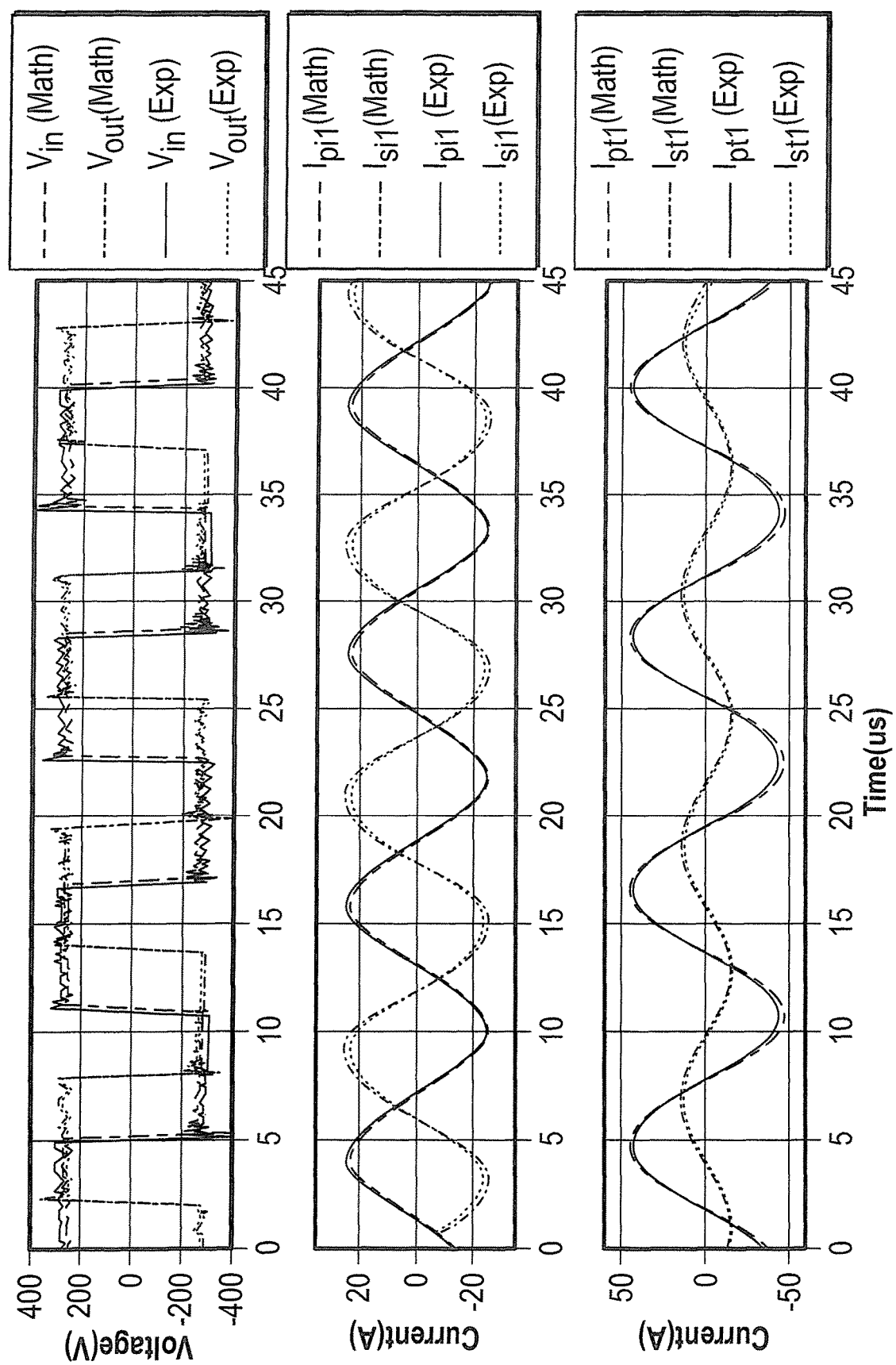
FIG. 7 shows current waveforms at the misaligned position (160, 0, 120)

FIGS. 6 and 7 present theoretical input and output currents as well as pad currents in comparison to experimental results at tuned (0, 0, 120), and misaligned (160, 0, 120) positions. As evident from the figures, both mathematical and experimental results are well aligned, which verifies the accuracy of the mathematical model. As expected from the mathematical model, the input and output currents, $I_{pi,2}$ and $I_{si,2}$, which are also the currents in the CL compensation networks, are very similar in magnitude and shape at both tuned and misaligned positions, proving that the power throughput of the system is approximately constant. This constant power can be explained by that with separation between the pads the reflected voltage $V_{pr,2}$ and $V_{sr,2}$ decrease resulting in an increased voltage in $V_{pi(LCL)}$ and $V_{si(LCL)}$, which thus leads to an increased current $I_{pt,1}$ and $I_{st,1}$ between $L_{pt,1}$ and $L_{st,1}$. This increase in the currents create an increase power throughput between windings $L_{pt,1}$ and $L_{st,1}$. However, since the current $I_{pi,2}$ and $I_{si,2}$ are maintained constant, the power transfer between windings $L_{pt,2}$ and $L_{st,2}$ will reduce as the coils move further apart. Thus, the decrease in power transfer between $L_{pt,2}$ and $L_{st,2}$ is compensated by the increase in power transfer between $L_{pt,1}$ and $L_{st,1}$, where constant power will be obtained at the operating region of the proposed topology. From FIGS. 6 and 7, it is also evident that the currents in both the primary and pick-up-side are intentionally tuned with inductive loading so that the input current is lagging in phase with the inverter voltage, which benefits for minimizing the turn-on losses in the semiconductors.

Figure 8A:
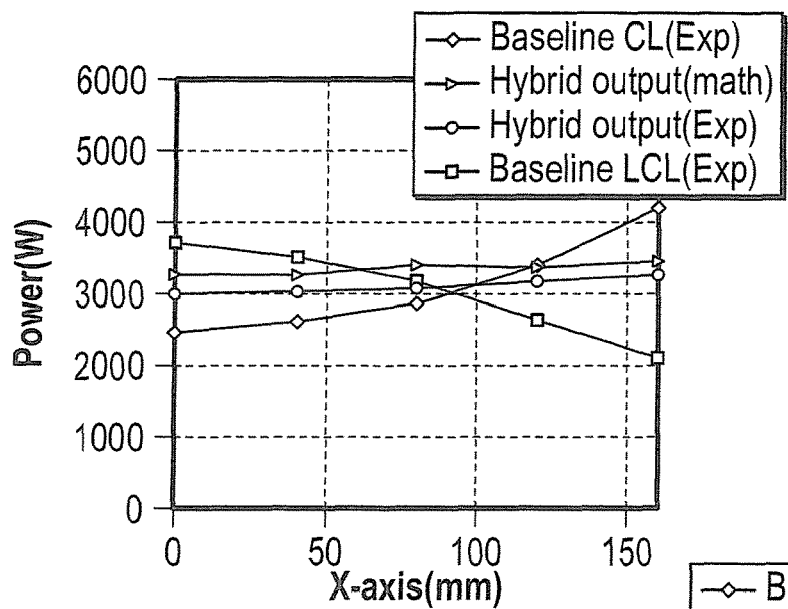
FIG. 8(*a*) is a graph of variation in output power due to pad misalignment with Z-axis: 100 mm FIG. 8(*b*) is a graph of variation in output power due to pad misalignment with Z-axis: 120 mm.
Figure 8B:
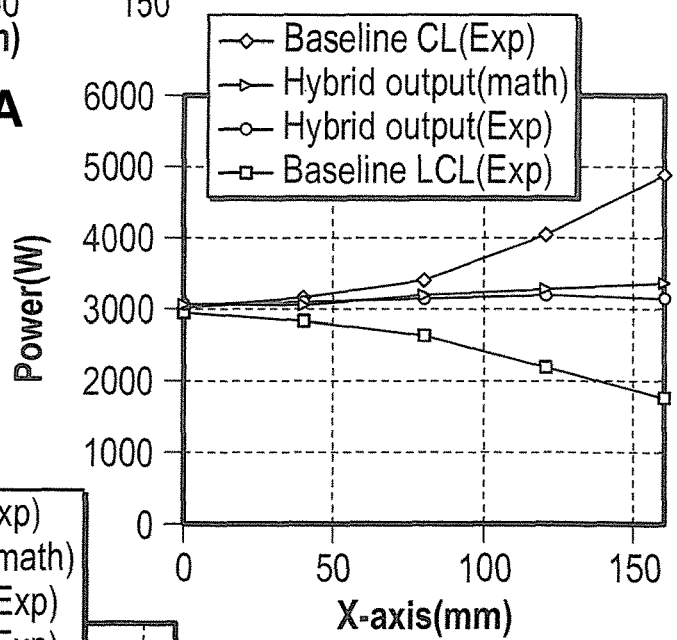
Figure 8C:
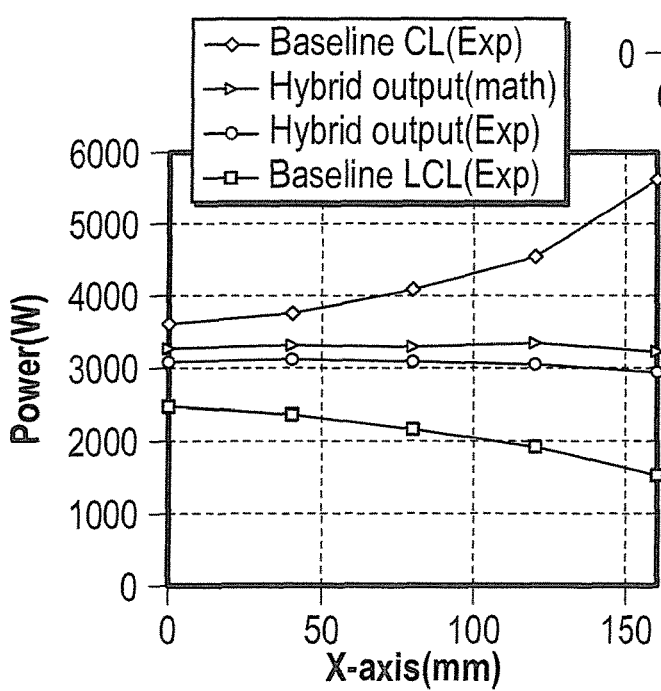

FIGS. 8(a)-8(c) the measured and theoretical power output of the series hybrid IPT system at tuned and misaligned positions to further demonstrate the validity of the hybrid concept. Note that an open loop controller was used with maximum phase modulations to demonstrate the variations in power output of the compensation networks. A conventional LCL tuned IPT system and a CL tuned IPT system, which use identical DD pads, with similar specification and fixed duty-cycle open-loop controllers, have been used as baseline systems to illustrate the ability of the series hybrid IPT system to maintain nearly constant output power. The power output from both baseline systems either increase or decrease being a function of the coupling coefficient with increasing vertical and horizontal displacements. As is evident from FIGS. 8(a)-8(c), the output power of either the baseline systems can change up to 100% due to misalignment whereas the proposed system maintains the output power approximately constant under the same conditions. This constant charging characteristic will reduce system complexity in terms of sensors and controllers that will save the construction costs, whilst, improving the reliability of a wireless charging system.

Figure 9:
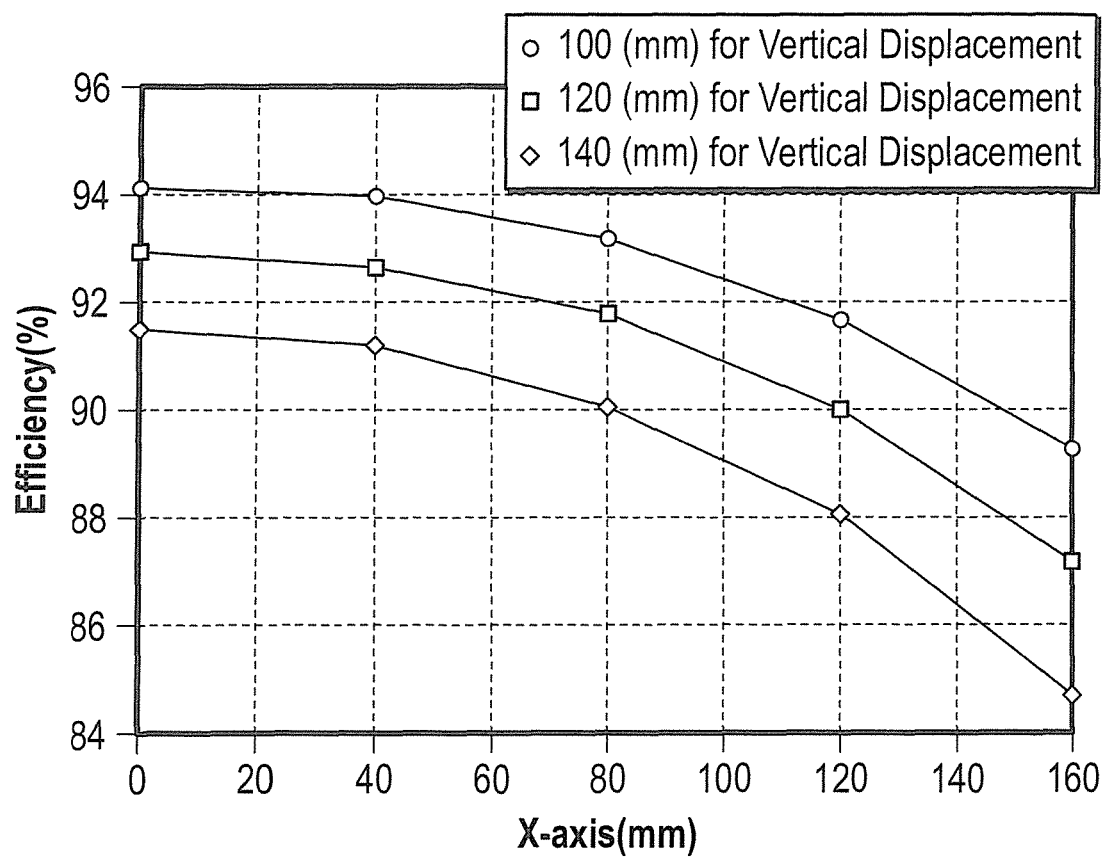
FIG. 9 shows a graph of variation in efficiency due to pad misalignment.

Measured DC-DC efficiency of the novel hybrid system, under same pad misalignment conditions and when delivering 3.3 kW of power, is shown in FIG. 9. The efficiency varies with both vertical and horizontal displacements and drops with pads misaligned. As can be seen from FIGS. 6 and 7, the current in CL network remains approximately constant for all displacements considered. But, the current in LCL network increases with increasing in pad displacements. Hence, the overall conduction loss in CL tuning network is nearly identical. In contrast, at minimum vertical displacement (0, 0, 100), the LCL network contributes less current as well as power but contributes current and power for largest displacements at (160, 0, 140), which leads a higher conduction loss result in a lower system efficiency. Meanwhile, the switching losses are also increasing with the pads misaligned, as evident from FIGS. 6 and 7, the phase between voltage and current varies, which induces more losses as the converter tends to lose zero voltage switching (ZVS) condition on the semiconductors. The maximum efficiency achieved in the series hybrid is 94%. This can be improved by using higher input and output voltages, and better switches. However, the prototype was constructed, as proof of concept, using relatively low input and output voltages, and the semiconductors with high on-resistances.

In order to verify the proposed hybrid IPT system can operate in situations where the pick-up pad is not in the vicinity of the primary pad, the system was tested by only energized the primary DD pad. Note that an open loop controller was used with maximum phase modulations, mimicking a failed sensing for vehicle loading conditions, or a communication interference over a vehicle and charging stations.

TABLE II

| | $I_{pi,2}$ (A-rms) | $I_{pt,1}$ (A-rms) | Loss (W) (%) |
|---|---|---|---|
| DD pad | 2.38 | 15.06 | 68.8 (2.1%) |
| Bipolar pad | 11.57 | 24.99 | 322.4 (9.8%) |

Figure 10:
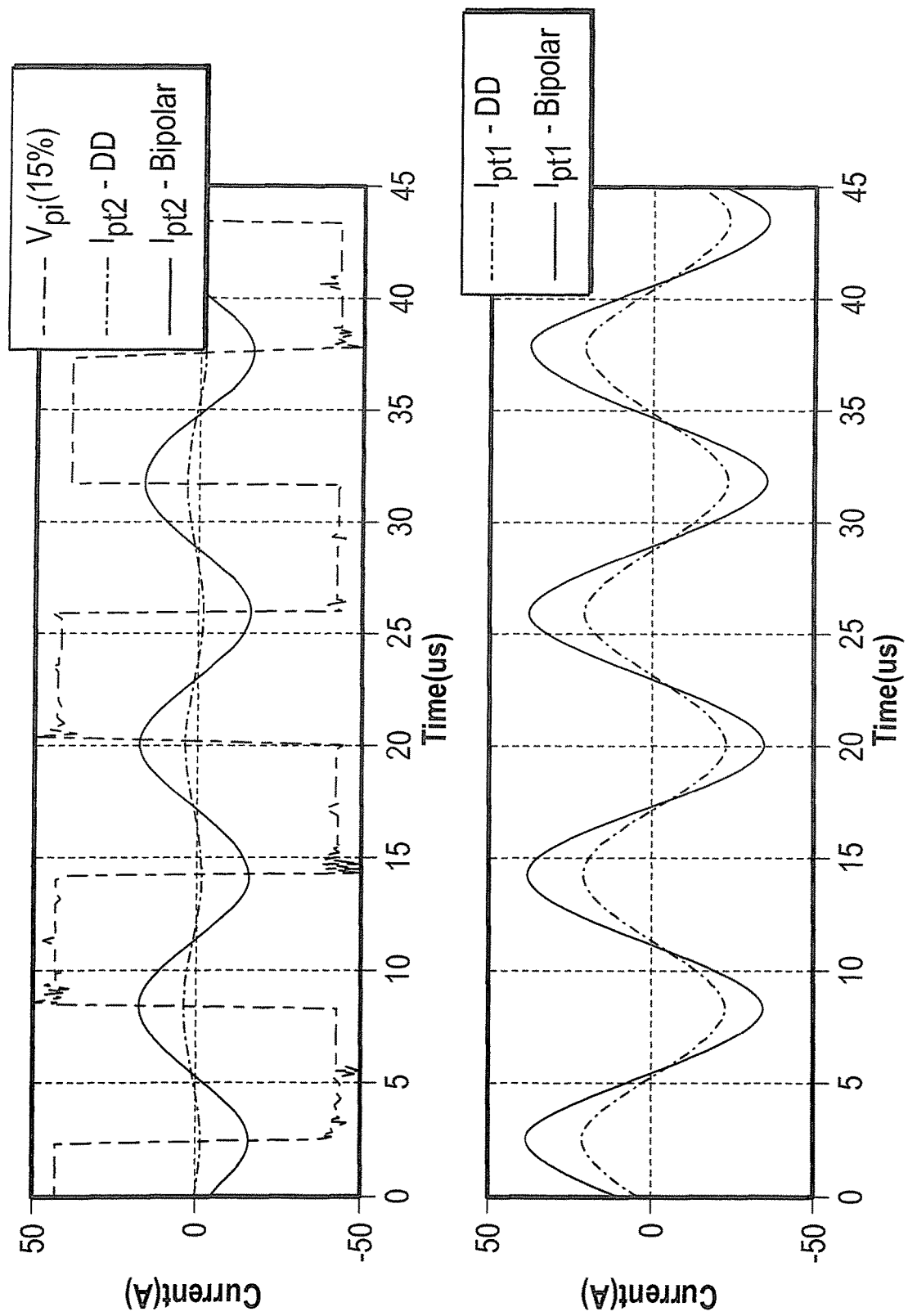
FIG. 10 shows current waveforms in the primary, in the absence of a secondary or pick-up circuit.
Figure 11:
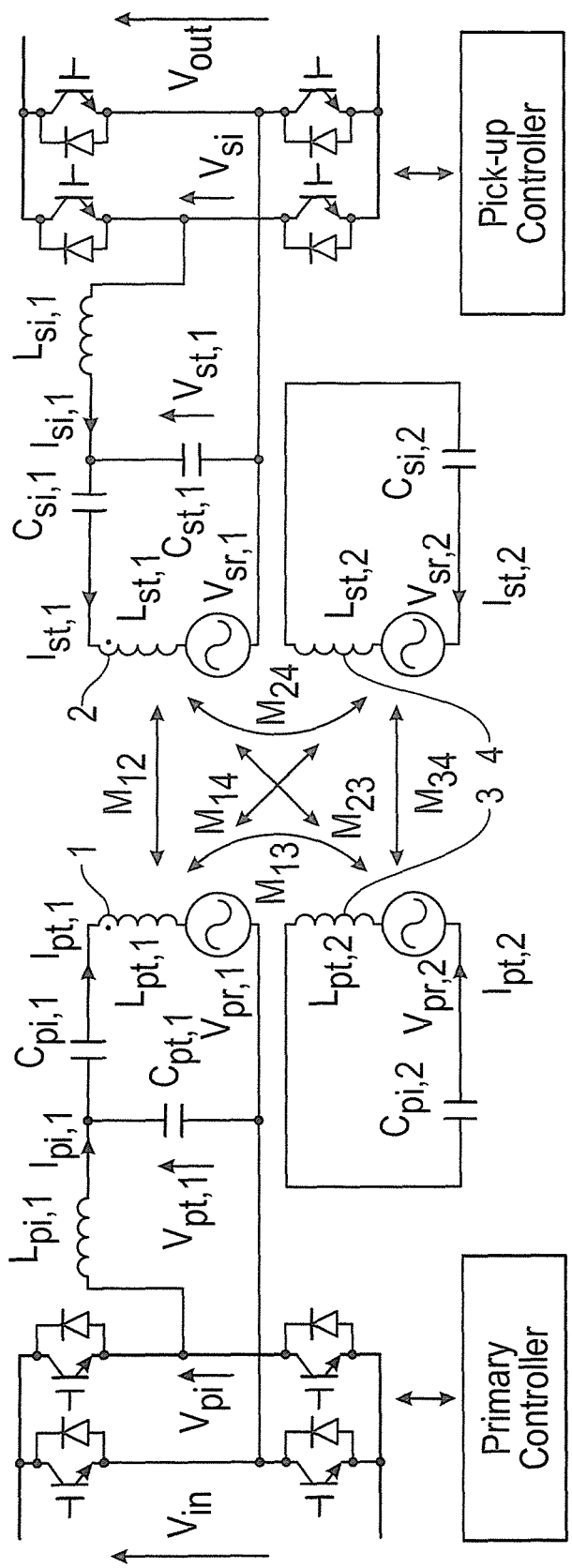
FIG. 11 is a circuit topology according to a second example.
Figure 12:
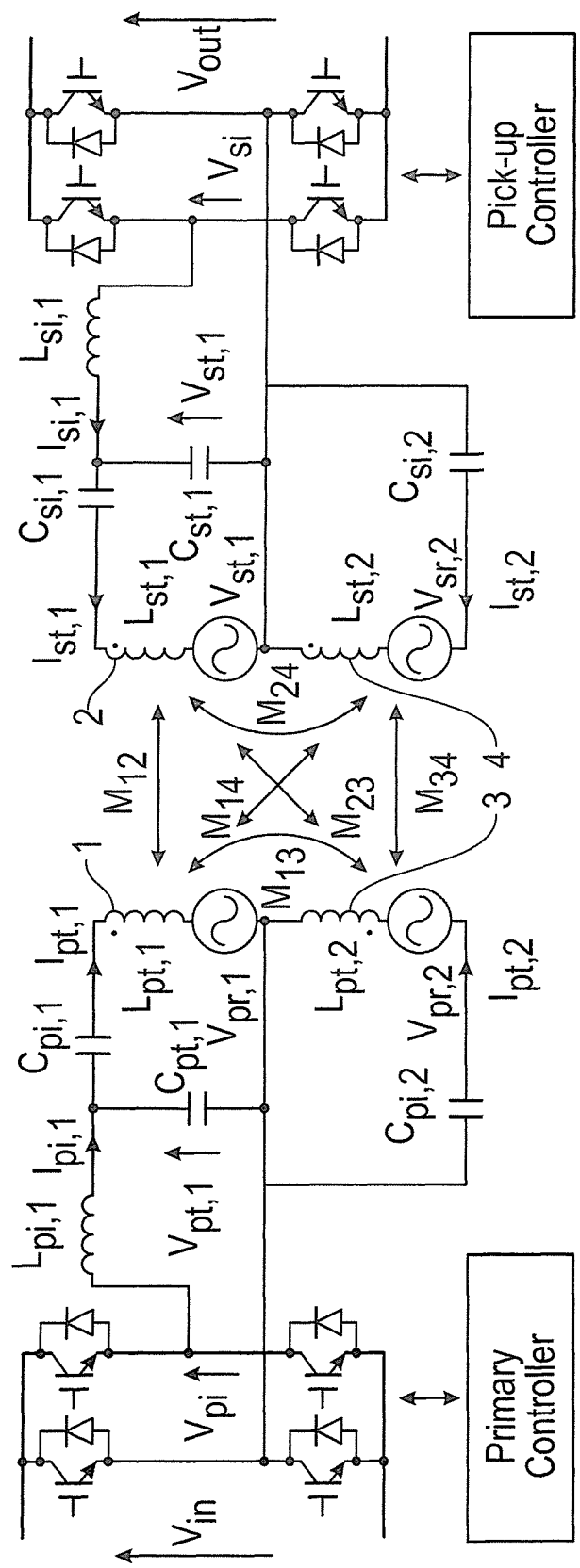
FIG. 12 is a circuit topology according to a third example.
Figure 13:
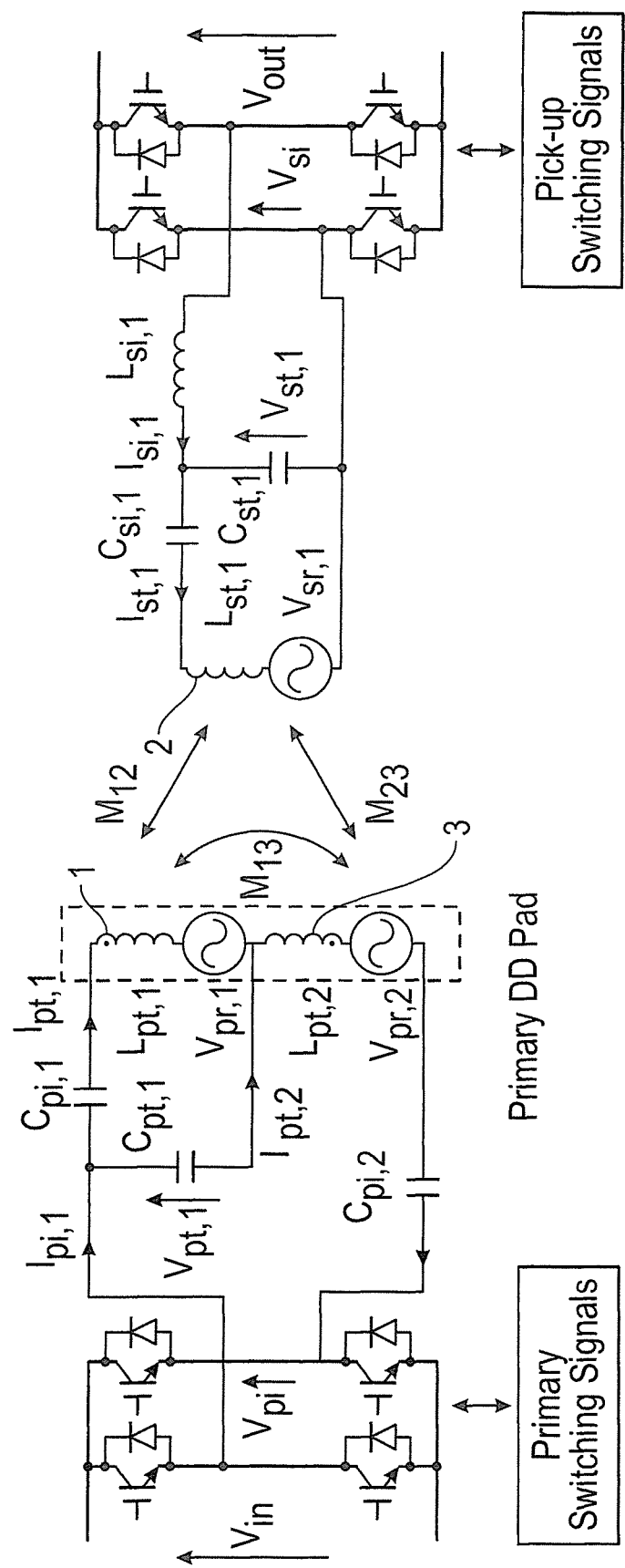
FIG. 13 is a circuit topology according to a fourth example.
Figure 14:
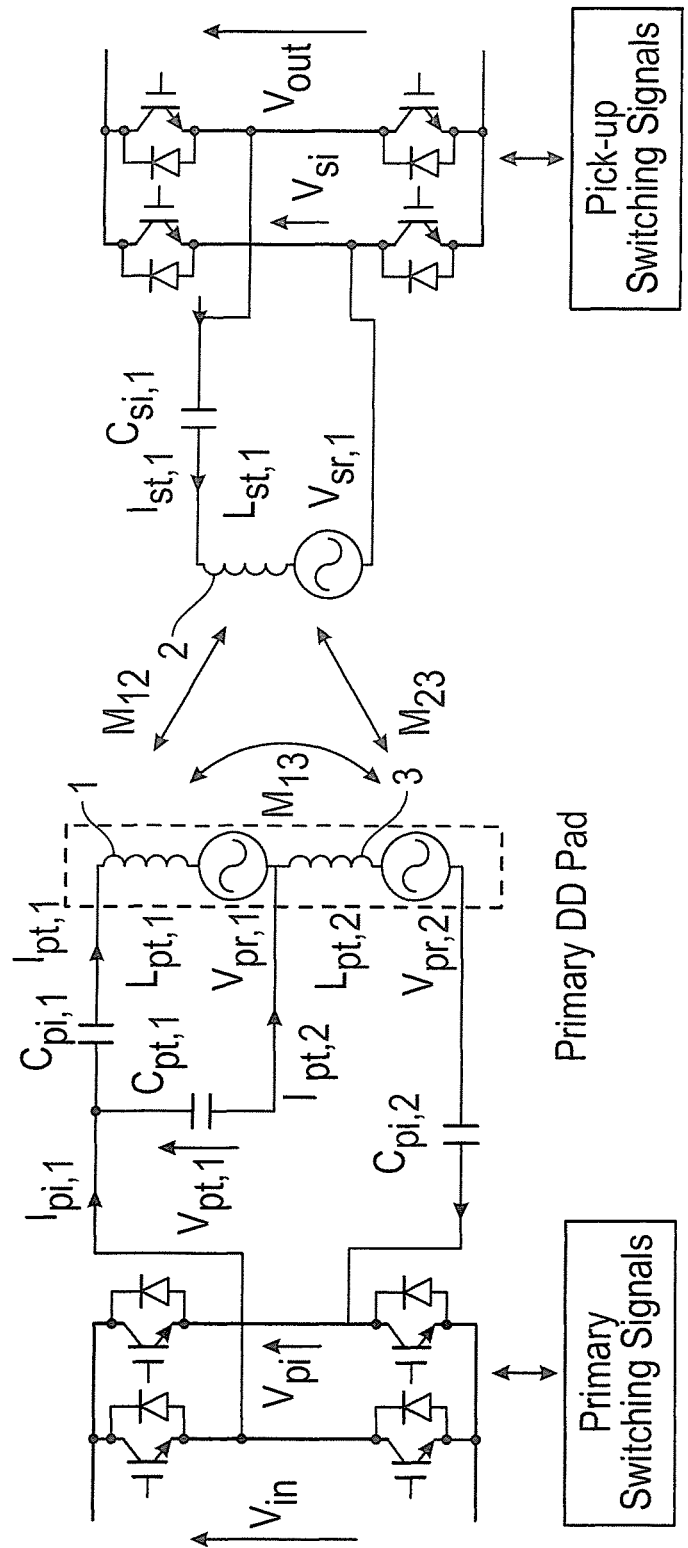
FIG. 14 is a circuit topology according to a fifth example.
Figure 15:
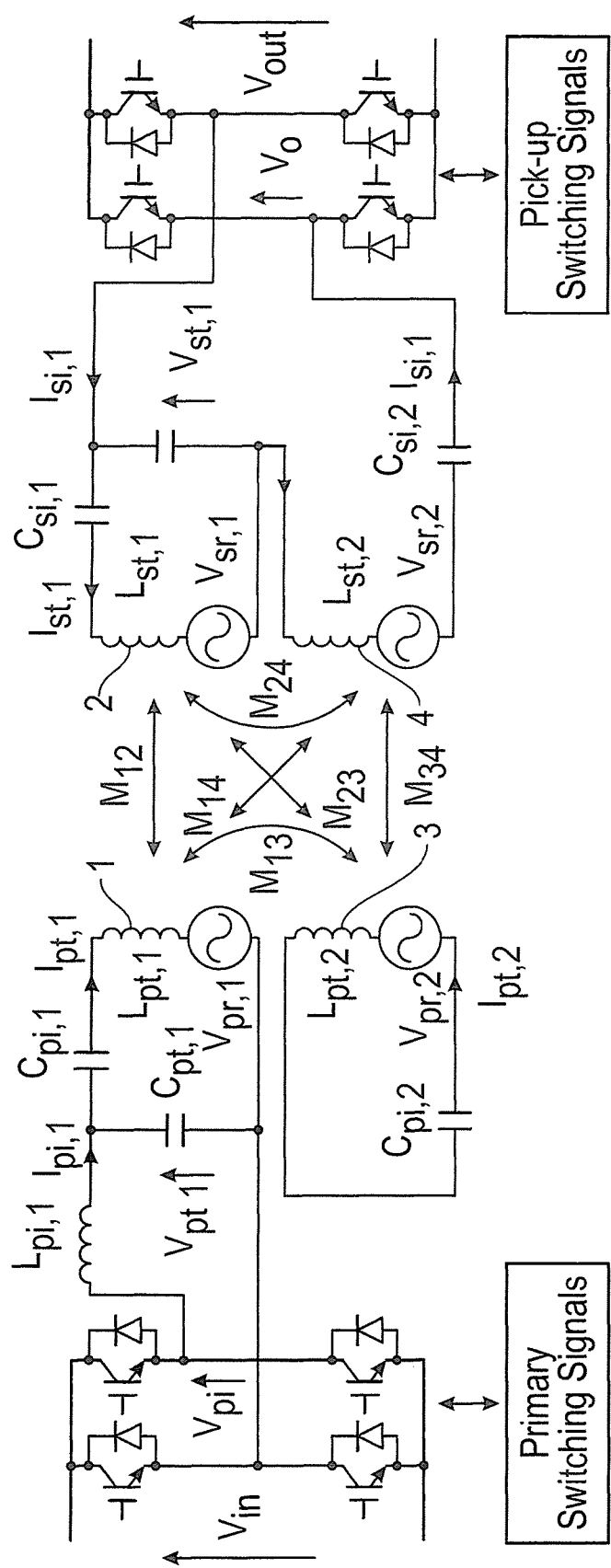
FIG. 15 is a circuit topology according to a sixth example.
Figure 16:
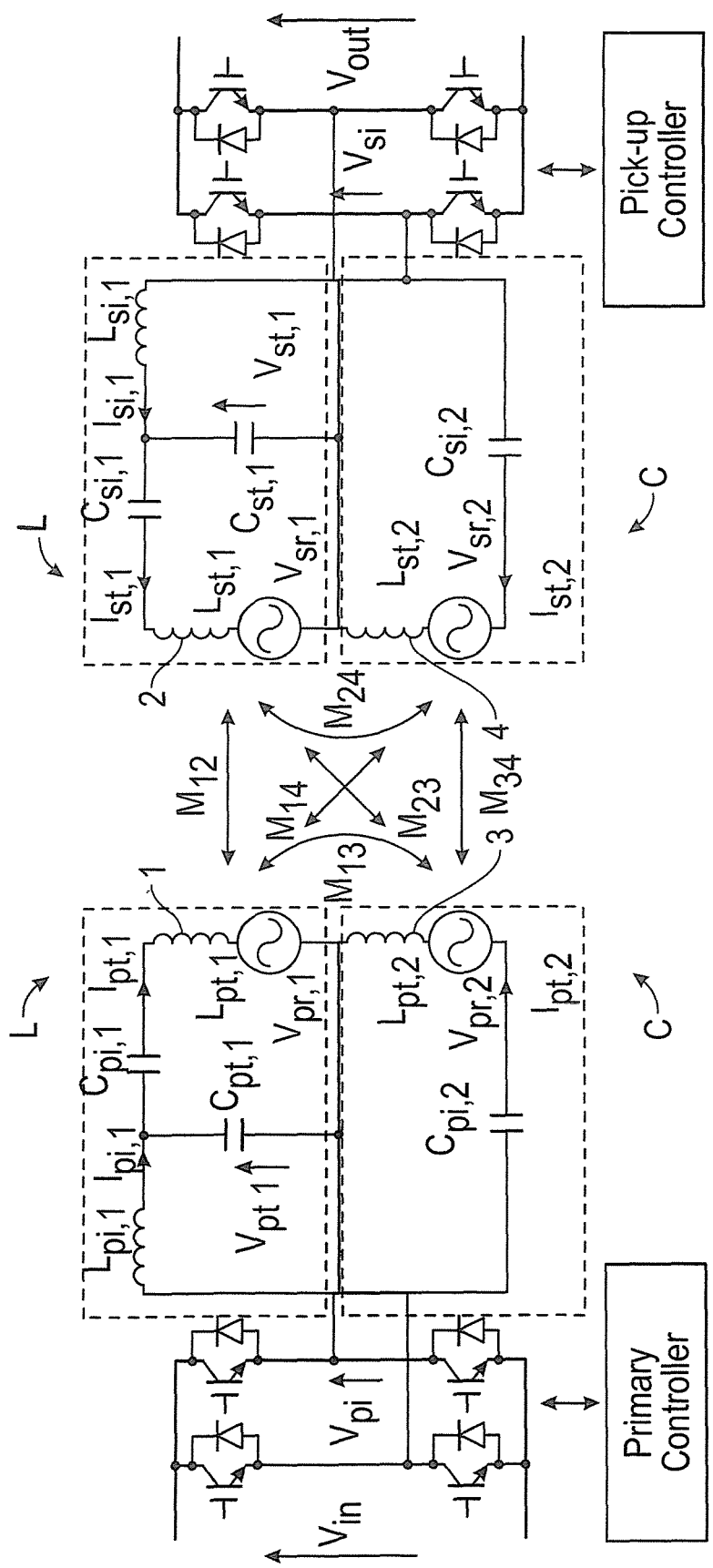
FIG. 16 is a circuit topology according to a seventh example.
Figure 17:
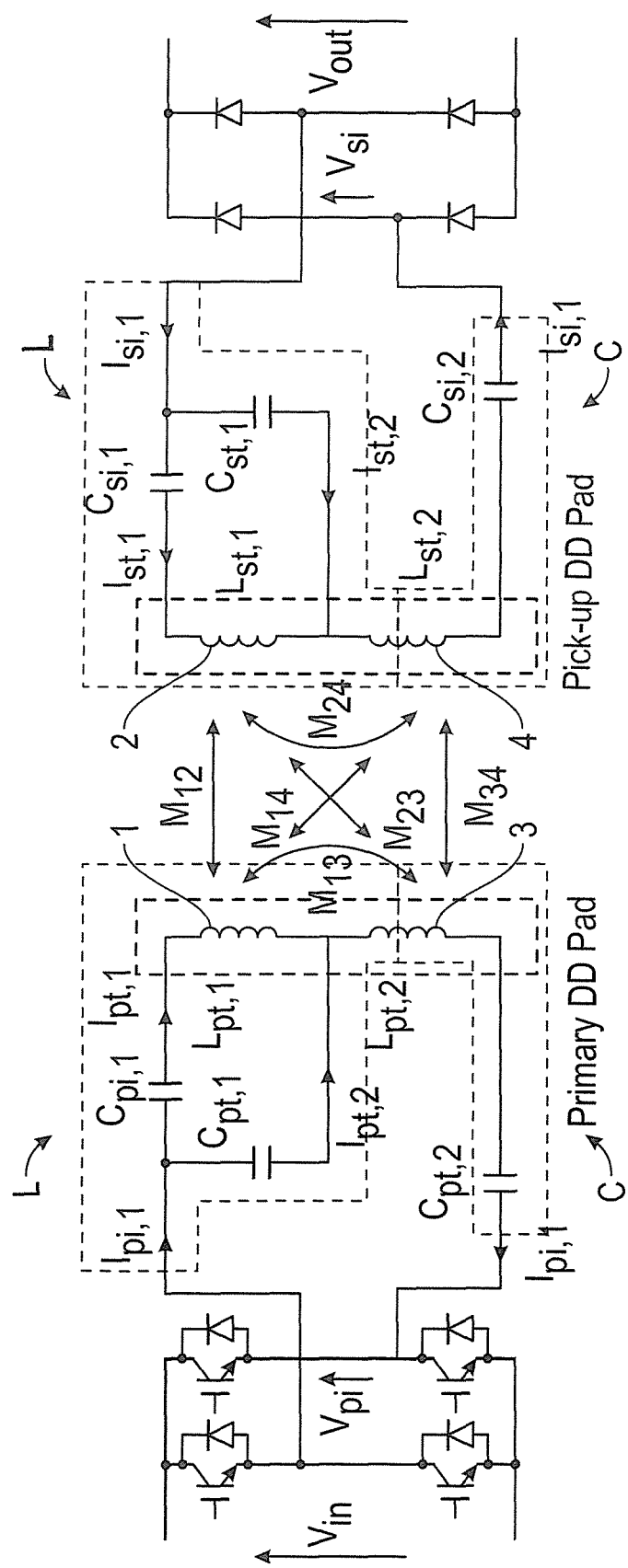
FIG. 17 is a circuit topology according to an eighth example.
Figure 18:
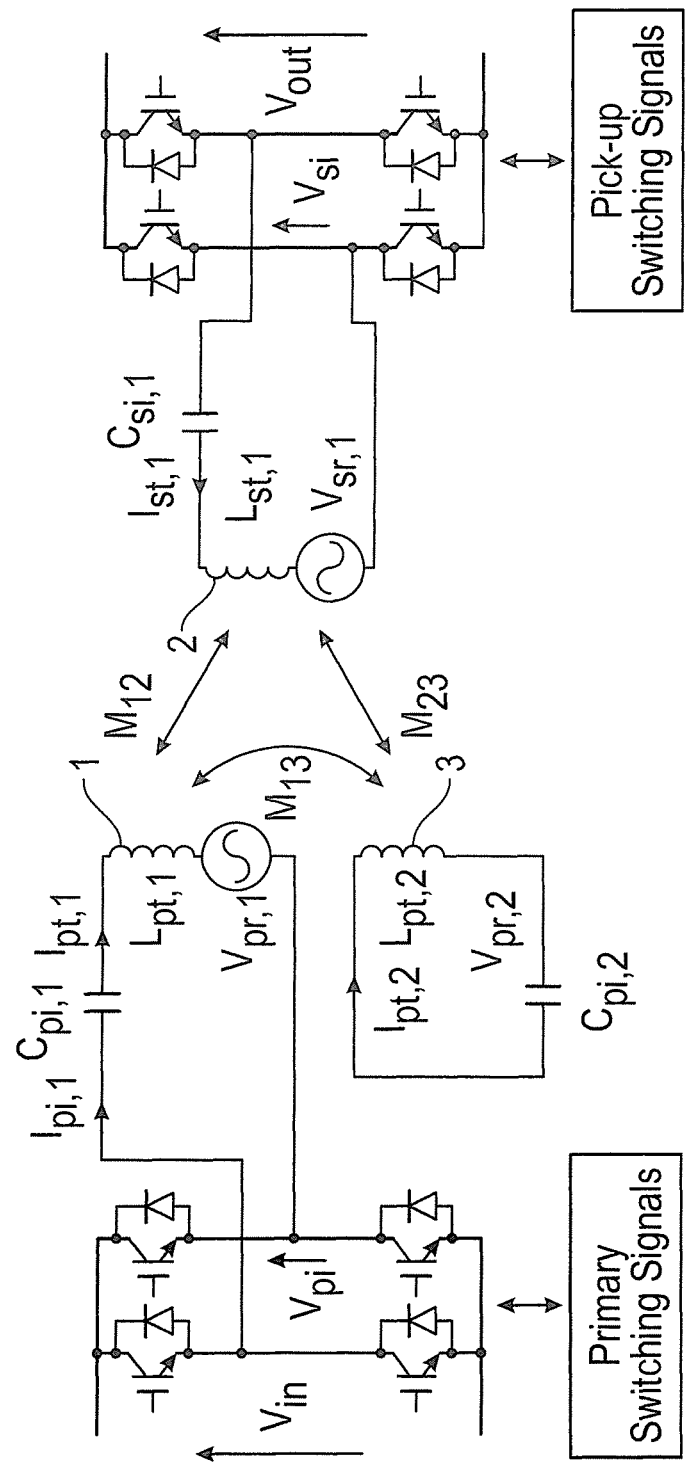
FIG. 18 is a circuit topology according to a ninth example.

As evident in Table II and currents $I_{pi,2}$ and $I_{pt,1}$ depicted in FIG. 10, with strong inter coupling $M_{13}$, the proposed prototype using DD pads only takes about 2.1% of the rated power. However, as a comparison by using the bi-polar pad, the total loss is about five times higher under an identical condition. It verified the function of $M_{13}$ presents in (15), which inter coupling in primary pad restricts the circulating currents $I_{pi,2}$ and $I_{pt,1}$ flowing through primary coils.

From the foregoing, it will be apparent that an IPT system that is tolerant for 3D pad misalignments is provided, which uses characteristics of LCL and CL compensation networks to negate the adverse effects from magnetic couplers. The system is able to deliver a constant power with varying coupling coefficient from 0.14 to 0.35. This constant charging characteristic reduces system complexity that will saves construction costs whilst improving the reliability of a wireless charging system.

Unless the context clearly requires otherwise, throughout the description, the words "comprise", "comprising", and the like, are to be construed in an inclusive sense as opposed to an exclusive or exhaustive sense, that is to say, in the sense of "including, but not limited to".

Although this invention has been described by way of example and with reference to possible exemplary embodiments thereof, it is to be understood that modifications or improvements may be made thereto without departing from the scope of the invention. The invention may also be said broadly to consist in the parts, elements and features referred to or indicated in the specification of the application, individually or collectively, in any or all combinations of two or more of said parts, elements or features. Furthermore, where reference has been made to specific components or integers of the invention having known equivalents, then such equivalents are herein incorporated as if individually set forth.

Any discussion of the prior art throughout the specification should in no way be considered as an admission that such prior art is widely known or forms part of common general knowledge in the field.

The invention claimed is:

1. A wireless power transfer device comprising:
   a switching circuit;
   a first resonator comprising a first compensation capacitor connected in series with a first tuned coil having a first end and a second end, wherein the first compensation capacitor is connected directly to the switching circuit, and
   a second resonator comprising a supplemental compensation capacitor connected in series with a second tuned coil having a first end and a second end, wherein the first end of the second tuned coil is connected to the second end of the first tuned coil, and wherein the supplemental compensation capacitor is connected directly to the switching circuit;
   wherein the first tuned coil and the second tuned coil are mutually coupled and tuned to the same frequency, and wherein the first resonator and the second resonator are configured have complementary power transfer characteristics.

2. The wireless power transfer device of claim 1, wherein the first resonator is configured to make power available via a first magnetic field caused by a first current in the first tune coils, the second resonator is configured to make power available via a second magnetic field caused by a second current in the second tune coils, and first resonator and the second resonator are configured to produce a phase angle of 90° between the first current and the second current.

3. The wireless power transfer device of claim 1, wherein the first tuned coil and the second tuned coil are differentially coupled.

4. The wireless power transfer device of claim 1, wherein the second resonator comprises a series compensation network.

5. The wireless power transfer device of claim 1, wherein a coupling factor of the mutual coupling between the first tuned coil and the second tuned coil is greater than or equal to about 0.15.

6. The wireless power transfer device of claim 1, wherein the mutual coupling between the first tuned coil and the second tuned coil is configured to inhibit circulating currents in the second resonator when the wireless power transfer device is making power available and a pick-up pad is not in the vicinity of the wireless power transfer device.

7. The wireless power transfer device of claim 1, wherein the first resonator comprises a second compensation capacitor connected in parallel with the first compensation capacitor and the first tuned coil.

8. The wireless power transfer device of claim 1, wherein a coupling factor of the mutual coupling between the first tuned coil and the second tuned coil is between 0.15 and 0.2.

9. The wireless power transfer device of claim 1, wherein the mutual coupling between the first tuned coil and the second tuned coil degrades circulating currents in the wireless power transfer device when the wireless power transfer device is making power available and a pick-up pad is not in the vicinity of the wireless power transfer device.

10. The wireless power transfer device claim 1, wherein the wireless power transfer device is configured to deliver substantially constant power, to a pick-up pad that is loosely coupled with the wireless power transfer device, when the coupling coefficient between the wireless power transfer device and the pick-up pad is in the range between 0.14 and 0.35.

11. A wireless power transfer device comprising:
a switching circuit;
a first coil having a first end and a second end;
a second coil having a first end and a second end, where the first end of the second coil is connected to the second end of the first coil, and wherein the first coil and second coil are connected with opposite polarity
a parallel compensation network for the first coil, wherein the parallel compensation network a comprises a first compensation capacitor connected in series with the first coil and a second compensation capacitor connected in parallel with the first compensation capacitor, wherein the first compensation capacitor and the second compensation capacitor are each connected directly between the switching circuit and the first and second ends, respectively, of the first coil; and
a series compensation network for the second coil comprising a supplemental compensation capacitor connected in series with the second coil directly between the second end of the second coil and the switching circuit,
wherein the two tuned coils are mutually coupled to inhibit circulating currents when the wireless power transfer device is making power available and a pick-up pad is not in the vicinity of the wireless power transfer device.

12. The wireless power transfer device of claim 11, wherein the two tuned coils, the parallel compensation network and the series compensation network form a tuned LCL network.

13. The wireless power transfer device of claim 11, wherein the two tuned coils are arranged in the same plane.

14. The wireless power transfer device of claim 11, wherein the two tuned coils are substantially planar and arranged in substantially the same plane.

15. The wireless power transfer device of claim 11, wherein the first tuned and the second tuned coil have different inductance values.

* * * * *

UNITED STATES PATENT AND TRADEMARK OFFICE
CERTIFICATE OF CORRECTION

| | |
|---|---|
| PATENT NO. | : 11,431,196 B2 |
| APPLICATION NO. | : 16/768314 |
| DATED | : August 30, 2022 |
| INVENTOR(S) | : Duleepa Jayanath Thrimawithana et al. |

It is certified that error appears in the above-identified patent and that said Letters Patent is hereby corrected as shown below:

In the Claims

Claim 10, Column 13, Line 30, please replace "The wireless power transfer device claim 1, wherein" with --The wireless power transfer device of claim 1, wherein--

Signed and Sealed this
Sixteenth Day of April, 2024

Katherine Kelly Vidal
*Director of the United States Patent and Trademark Office*